(12) United States Patent
Pouran Ben Veyseh et al.

(10) Patent No.: US 12,019,982 B2
(45) Date of Patent: Jun. 25, 2024

(54) EVENT UNDERSTANDING WITH DEEP LEARNING

(71) Applicant: ADOBE INC., San Jose, CA (US)

(72) Inventors: Amir Pouran Ben Veyseh, Eugene, OR (US); Franck Dernoncourt, San Jose, CA (US); Ning Xu, Milpitas, CA (US)

(73) Assignee: ADOBE INC., San Jose, CA (US)

( * ) Notice: Subject to any disclaimer, the term of this patent is extended or adjusted under 35 U.S.C. 154(b) by 319 days.

(21) Appl. No.: 17/452,143

(22) Filed: Oct. 25, 2021

(65) Prior Publication Data

US 2023/0127652 A1    Apr. 27, 2023

(51) Int. Cl.
*G06F 40/211*    (2020.01)
*G06F 40/166*    (2020.01)
*G06F 40/279*    (2020.01)
*G06F 40/30*    (2020.01)
*G06N 3/04*    (2023.01)
*G06N 3/045*    (2023.01)

(52) U.S. Cl.
CPC .......... *G06F 40/211* (2020.01); *G06F 40/166* (2020.01); *G06F 40/279* (2020.01); *G06N 3/04* (2013.01); *G06N 3/045* (2023.01); *G06F 40/30* (2020.01)

(58) Field of Classification Search
CPC ...... G06N 3/0455; G06N 3/045; G06F 40/30; G06F 40/211; G06F 40/279
See application file for complete search history.

(56) References Cited

U.S. PATENT DOCUMENTS

| | | | |
|---|---|---|---|
| 2020/0387574 A1* | 12/2020 | Min | G06N 3/04 |
| 2021/0271822 A1* | 9/2021 | Bui | G06F 40/205 |
| 2021/0295095 A1* | 9/2021 | Pan | G06F 40/30 |
| 2021/0365306 A1* | 11/2021 | Haldar | G06F 40/205 |
| 2022/0004714 A1* | 1/2022 | Li | G06F 40/216 |

(Continued)

OTHER PUBLICATIONS

Lee et al., "Effective Use of Graph Convolution Network and Contextual Sub-Tree for Commodity News Event Extraction." arXiv preprint arXiv:2109.12781 (Sep. 27, 2021). (Year: 2021).*

(Continued)

*Primary Examiner* — Samuel G Neway
(74) *Attorney, Agent, or Firm* — F. CHAU & ASSOCIATES, LLC

(57) ABSTRACT

Systems and methods for natural language processing are described. One or more embodiments of the present disclosure generate a word representation vector for each word of a text comprising an event trigger word and an argument candidate word; generate a dependency tree based on the text and the word representation vector; determine that at least one word of the text is independent of a relationship between the event trigger word and the argument candidate word; remove the at least one word from the dependency tree based on the determination to obtain a pruned dependency tree; generate a modified representation vector for each word of the pruned dependency tree using a graph convolutional network (GCN); and identify the relationship between the event trigger word and the argument candidate word based on the modified representation vector for each word of the pruned dependency tree.

19 Claims, 12 Drawing Sheets

(56) References Cited

U.S. PATENT DOCUMENTS

| | | | |
|---|---|---|---|
| 2022/0050967 A1* | 2/2022 | Veyseh | G06F 40/289 |
| 2023/0127652 A1* | 4/2023 | Pouran Ben Veyseh | |
| | | | G06F 40/279 |
| | | | 704/9 |

OTHER PUBLICATIONS

Zhang et al., "Graph convolution over pruned dependency trees improves relation extraction." arXiv preprint arXiv:1809.10185 (2018). (Year: 2018).*

Dai et al., "Event argument extraction via a distance-sensitive graph convolutional network." Natural Language Processing and Chinese Computing: 10th CCF International Conference, NLPCC 2021, Qingdao, China, Oct. 13-17, 2021, Proceedings, Part II 10. Springer International Publishing, 2021. (Year: 2021).*

Information Disclosure Statement filed Apr. 6, 2021 in related U.S. Appl. No. 17/223,166.

1 Balachandran, et al., "StructSum: Incorporating Latent and Explicit Sentence Dependencies for Single Document Summarization", In arXiv preprint arXiv:2003.00576v1 [cs.CL] Mar. 1, 2020, 11 pages.

2 Chen, et al., "Event Extraction via Dynamic Multi-Pooling Convolutional Neural Networks", In Proceedings of the 53rd Annual Meeting of the Association for Computational Linguistics and the 7th International Joint Conference on Natural Language Processing, 2015, pp. 167-176.

3 Chen, et al., "Joint Modeling of Arguments for Event Understanding", In Proceedings of the First Workshop on Computational Approaches to Discourse, pp. 96-101, 2020.

4 Christopoulou, et al., "Connecting the Dots: Document-level Neural Relation Extraction with Edge-oriented Graphs", In Proceedings of the Conference on Empirical Methods in Natural Language Processing (EMNLP), arXiv preprint arXiv:1909.00228v1 [cs.CL] Aug. 31, 2019, 12 pages.

5 Devlin, et al. "BERT: Pre-training of Deep Bidirectional Transformers for Language Understanding", In Proceedings of the Conference of the North American Chapter of the Association for Computational Linguistics: Human Language Technologies (NAACL-HLT), arXiv preprint arXiv:1810.04805v2 [cs.CL] May 24, 2019, 16 pages.

6 Ebner, et al., "Multi-Sentence Argument Linking", In Proceedings of the Annual Meeting of the Association for Computational Linguistics (ACL), arXiv preprint arXiv:1911.03766v3 [cs.CL] May 9, 2020, 21 pages.

7 Gupta, et al., "Neural Relation Extraction within and across Sentence Boundaries", In The Thirty-Third AAAI Conference on Artificial Intelligence (AAAI-19), 2019, pp. 6513-6520.

8 Hong, et al., "Using Cross-Entity Inference to Improve Event Extraction", In Proceedings of the 49th Annual Meeting of the Association for Computational Linguistics, pp. 1127-1136, 2011.

9 Kipf, et al., "Semi-Supervised Classification With Graph Convolutional Networks", In Proceedings of the International Conference on Learning Representations (ICLR), arXiv preprint arXiv:1609.02907v4 [cs.LG] Feb. 22, 2017, 14 pages.

10 Lai, et al., "Exploiting the Matching Information in the Support Set for Few Shot Event Classification", In Proceedings of the 24th Pacific-Asia Conference on Knowledge Discovery and Data Mining (PAKDD), 2020, pp. 233-245.

11 Lai, et al., "Event Detection: Gate Diversity and Syntactic Importance Scores for Graph Convolution Neural Networks", In Proceedings of the 2020 Conference on Empirical Methods in Natural Language Processing, pp. 5405-5411, 2020.

12 Li, et al., "Joint Event Extraction via Structured Prediction with Global Features", In Proceedings of the 51st Annual Meeting of the Association for Computational Linguistics, pp. 73-82, 2013.

13 Lin, et al., "A Joint Neural Model for Information Extraction with Global Features", In Proceedings of the 58th Annual Meeting of the Association for Computational Linguistics, pp. 7999-8009, 2020.

14 McClosky, et al., "Event Extraction as Dependency Parsing", In BioNLP Shared Task Workshop, 2011, 10 pages.

15 Miwa, et al., "Comparable Study of Event Extraction in Newswire and Biomedical Domains", In Proceedings of the International Conference on Computational Linguistics (COLING), 2014, 10 pages.

16 Nan, et al., "Reasoning with Latent Structure Refinement for Document-Level Relation Extraction", In Proceedings of the Annual Meeting of the Association for Computational Linguistics (ACL), arXiv preprint arXiv:2005.06312v3 [cs.CL] Jul. 28, 2020, 12 pages.

17 Nguyen, et al., "Cross-Task Instance Representation Interactions and Label Dependencies for Joint Information Extraction with Graph Convolutional Networks", In Proceedings of the 2021 Conference of the North American Chapter of the Association for Computational Linguistics: Human Language Technologies, pp. 27-38, 2021.

18 Nguyen, et al., "Joint Event Extraction via Recurrent Neural Networks", In Proceedings of the Conference of the North American Chapter of the Association for Computational Linguistics: Human Language Technologies (NAACL-HLT), 2016, 10 pages.

19 Nguyen, et al., "A Two-stage Approach for Extending Event Detection to New Types via Neural Networks". In Proceedings of the 1st ACL Workshop on Representation Learning for NLP (RepL4NLP), 2016, 8 pages.

20 Nguyen, et al., "Event Detection and Domain Adaptation with Convolutional Neural Networks", In Proceedings of the 53rd Annual Meeting of the Association for Computational Linguistics and the 7th International Joint Conference on Natural Language Processing (Short Papers), pp. 365-371, 2015.

21 Nguyen, et al., "Graph Convolutional Networks with Argument-Aware Pooling for Event Detection", In Proceedings of the Association for the Advancement of Artificial Intelligence (AAAI), 2018, 8 pages.

22 Nguyen, et al., "One for All: Neural Joint Modeling of Entities and Events", In Proceedings of the Association for the Advancement of Artificial Intelligence (AAAI), arXiv preprint arxiv:1812.00195v1 [cs.CL] Dec. 1, 2018, 8 pages.

23 Pan, et al., "Semantic Graphs for Generating Deep Questions", In Proceedings of the 58th Annual Meeting of the Association for Computational Linguistics, pp. 1463-1475, 2020.

24 Patwardhan, et al. "A Unified Model of Phrasal and Sentential Evidence for Information Extraction", In Proceedings of the Conference on Empirical Methods in Natural Language Processing (EMNLP), 2009, 10 pages.

25 Peyré, et al., "Computational Optimal Transport", In Computational Optimal Transport, Foundations and Trends® in Computer Graphics and Vision, vol. XX, No. XX, pp. 1-205, 2019.

26 Riedel, et al. "Robust Biomedical Event Extraction with Dual Decomposition and Minimal Domain Adaptation", In BioNLP Shared Task 2011 Workshop, pp. 46-50.

27 Sahu, et al., "Inter-sentence Relation Extraction with Document-level Graph Convolutional Neural Network", In Proceedings of the 57th Annual Meeting of the Association for Computational Linguistics, pp. 4309-4316, 2019.

28 Sha, et al., "Jointly Extracting Event Triggers and Arguments by Dependency-Bridge RNN and Tensor-Based Argument Interaction", The Thirty-Second AAAI Conference on Artificial Intelligence (AAAI-18), 2018, pp. 5916-5923.

29 Thayaparan, et al., "Identifying Supporting Facts for Multi-hop Question Answering with Document Graph Networks", Proceedings of the Thirteenth Workshop on Graph-Based Methods for Natural Language Processing (TextGraphs-13), pages 42-51, 2019.

30 Tran, et al., "The Dots Have Their Values: Exploiting the Node-Edge Connections in Graph-based Neural Models for Document-level Relation Extraction", In Findings of the Association for Computational Linguistics: EMNLP 2020, pp. 4561-4567, 2020.

31 Pouran Ben Veyseh, et al., "Exploiting the Syntax-Model Consistency for Neural Relation Extraction", In Proceedings of the 58th Annual Meeting of the Association for Computational Linguistics, pp. 8021-8032, 2020.

(56) References Cited

OTHER PUBLICATIONS

32Pouran Ben Veyseh, et al., "Multi-View Consistency for Relation Extraction via Mutual Information and Structure Prediction", In The Thirty-Fourth AAAI Conference on Artificial Intelligence (AAAI-20), 2020, pp. 9106-9113.
33Pouran Ben Veyseh, et al., "Graph Transformer Networks with Syntactic and Semantic Structures for Event Argument Extraction", In Findings of the Association for Computational Linguistics: EMNLP 2020, pp. 3651-3661, 2020.
34Wang, et al., "HMEAE: Hierarchical Modular Event Argument Extraction", In Proceedings of the 2019 Conference on Empirical Methods in Natural Language Processing and the 9th International Joint Conference on Natural Language Processing, pp. 5777-5783, 2019.
35Yang, et al., "Joint Extraction of Events and Entities within a Document Context", In Proceedings of the Conference of the North American Chapter of the Association for Computational Linguistics: Human Language Technologies (NAACL-HLT), arXiv preprint arXiv:1609.03632v1 [cs.CL] Sep. 12, 2016, 11 pages.
36Yang, et al., "Exploring Pre-trained Language Models for Event Extraction and Generation", In Proceedings of the 57th Annual Meeting of the Association for Computational Linguistics, pp. 5284-5294, 2019.
37Zhang, et al., "Extracting Entities and Events as a Single Task Using a Transition-Based Neural Model", In Proceedings of the Twenty-Eighth International Joint Conference on Artificial Intelligence (IJCAI-19), pp. 5422-5428, 2019.
38Zhang, et al., "Every Document Owns Its Structure: Inductive Text Classification via Graph Neural Networks", In Proceedings of the 58th Annual Meeting of the Association for Computational Linguistics, pp. 334-339, 2020.
39Zhang, et al., "Graph Convolution over Pruned Dependency Trees Improves Relation Extraction", In Proceedings of the Conference on Empirical Methods in Natural Language Processing (EMNLP), 2018, 13 pages.
40Zhang, et al., "A Question Answering based Framework for One-step Event Argument Extraction", In IEEE Access, vol. 8, 65420-65431, 2020, 12 pages.
41Zhang, et al., "A Two-Step Approach for Implicit Event Argument Detection", In Proceedings of the 58th Annual Meeting of the Association for Computational Linguistics, pp. 7479-7485, 2020.
Veyseh, et al., "Graph Transformer Networks with Syntactic and Semantic Structures for Event Argument Extraction", Findings of the Association for Computational Linguistics: EMNLP 200, pp. 3651-3661.
Yoshikawa, et al., "Coreference based event-argument relation extraction on biomedical text", Journal of Biomedical Semantics 2011, 2 (Suppl 5):6S, 14 pages.
Pedersen, et al., "WordNet::Similarity—Measuring the Relatedness of Concepts", 2-4. HLT-NAACL-Demonstrations 04: Demonstration Papers at HLT-NAACL 2004, 4 pages.
Liu, et al. "A Dependency-Based Neural Network for Relation Classification", Proceedings of the 53rd Annual Meetings of the Association for Computational Linguistics and the 7th International Joint Conference on Natural Language Processing (Short Paper), pp. 285-290, Jul. 26-31, 2015.
Patwardhan, et al., "Using WordNet-based Context Vectors to Estimate the Semantic Relatedness of Concepts", Proceedings of the EACL 2006 Workshop on Making Sense of Sense: Bringing Computational Linguistics and Psycholinguistics Together, Apr. 2006, 8 pages.
Chambers, et al., "Template-Based Information Extraction without the Templates", Proceedings of the 49th Annual Meeting of the Association for Computational Linguistics, pp. 976-986, Jun. 19-24, 2011.
Ebner, et al., "Multi-Sentence Argument Linking", Proceedings of the 58th Annual Meeting of the Association for Computational Linguistics, pp. 8057-8077, Jul. 5-10, 2020.
Veyseh, et al., "Inducing Rich Interaction Structures Between Words for Document-Level Event Argument Extraction", May 2021, PAKDD 2021, pp. 703-715.
Office Action dated Mar. 27, 2023 in related U.S. Appl. No. 17/223,166.

\* cited by examiner

EVENT UNDERSTANDING WITH DEEP LEARNING

BACKGROUND

The following relates generally to natural language processing, and more specifically to event argument extraction.

Natural language processing (NLP) refers to techniques for using computers to interpret natural language. In some cases, NLP tasks involve assigning annotation data such as grammatical information to words or phrases within a natural language expression. Different classes of machine learning algorithms have been applied to NLP tasks.

Event extraction is an NLP task that involves identifying instances of events in text. In some examples, event extraction involves a number of sub-tasks including entity detection, event detection, and event argument extraction. Entity detection refers to identifying entities such as people, objects, and places. Event detection refers to identifying events such as actions or moments referred to within a text. Event argument extraction refers to identifying the relationships between the entity mentions and the events (event participants and spatio-temporal attributes, collectively known as event arguments).

Conventionally, sentence-level event argument extraction is used to determine the relationship between an event trigger word and an argument candidate word in the same sentence. However, systems designed for sentence-level event argument extraction systems are not scalable to perform document-level event argument extraction, where an argument candidate word can be located far from an event trigger word. Therefore, there is a need in the art for improved event argument extraction systems that are scalable and efficient in document-level event argument extraction.

SUMMARY

The present disclosure describes systems and methods for natural language processing. One or more embodiments of the disclosure provide an event argument extraction apparatus trained using machine learning techniques to predict a relationship between an event trigger word and an argument candidate word based on a high-dimensional representation vector for each word of a pruned dependency tree. For example, an event argument extraction network may be trained for document-level event argument extraction and role prediction.

In some embodiments, the event argument extraction apparatus prunes words that are not useful or relevant to identify a relationship between the event trigger word and the candidate argument word resulting in increased accuracy. In some examples, optimal transport (OT) methods are used for optimal alignment where syntactic and semantic distances of the words on a dependency path are simultaneously modeled for joint optimization. Additionally, pruning a dependency tree of a document based on semantics of the words can preserve important words and excluding irrelevant words.

A method, apparatus, and non-transitory computer readable medium for natural language processing are described. One or more embodiments of the method, apparatus, and non-transitory computer readable medium include generating a word representation vector for each word of a text comprising an event trigger word and an argument candidate word; generating a dependency tree based on the text and the word representation vector; determining that at least one word of the text is independent of a relationship between the event trigger word and the argument candidate word; removing the at least one word from the dependency tree based on the determination to obtain a pruned dependency tree; generating a modified representation vector for each word of the pruned dependency tree using a graph convolutional network (GCN); and identifying the relationship between the event trigger word and the argument candidate word based on the modified representation vector for each word of the pruned dependency tree.

A method, apparatus, and non-transitory computer readable medium for training a neural network are described. One or more embodiments of the method, apparatus, and non-transitory computer readable medium include receiving training data including text comprising an event trigger word, an argument candidate word, and a ground truth relationship between the event trigger word and the argument candidate word; generating a word representation vector for each word of the text using a text encoder; generating a dependency tree based on the text and the word representation vector; determining that at least one word of the text is independent of a relationship between the event trigger word and the argument candidate word; removing the at least one word from the dependency tree based on the determination to obtain a pruned dependency tree; generating a modified representation vector for each word of the pruned dependency tree using a graph convolutional network (GCN); identifying the relationship between the event trigger word and the argument candidate word using a classification network based on the modified representation vector for each word of the pruned dependency tree; computing a loss function by comparing the identified relationship to the ground truth relationship; and updating parameters of the classification network based on the loss function.

An apparatus and method for natural language processing are described. One or more embodiments of the apparatus and method include a text encoder configured to generate a word representation vector for each word of a text comprising an event trigger word and an argument candidate word; a parser configured to generate a dependency tree based on the text and the word representation vector; a pruning component configured to determine that at least one word of the text is independent of a relationship between the event trigger word and the argument candidate word, and remove the at least one word from the dependency tree based on the determination to obtain a pruned dependency tree; a GCN configured to generate a modified representation vector for each word of the pruned dependency tree; and a classification network configured to identify the relationship between the event trigger word and the argument candidate word based on the modified representation vector for each word of the pruned dependency tree.

DETAILED DESCRIPTION

Figure 1:
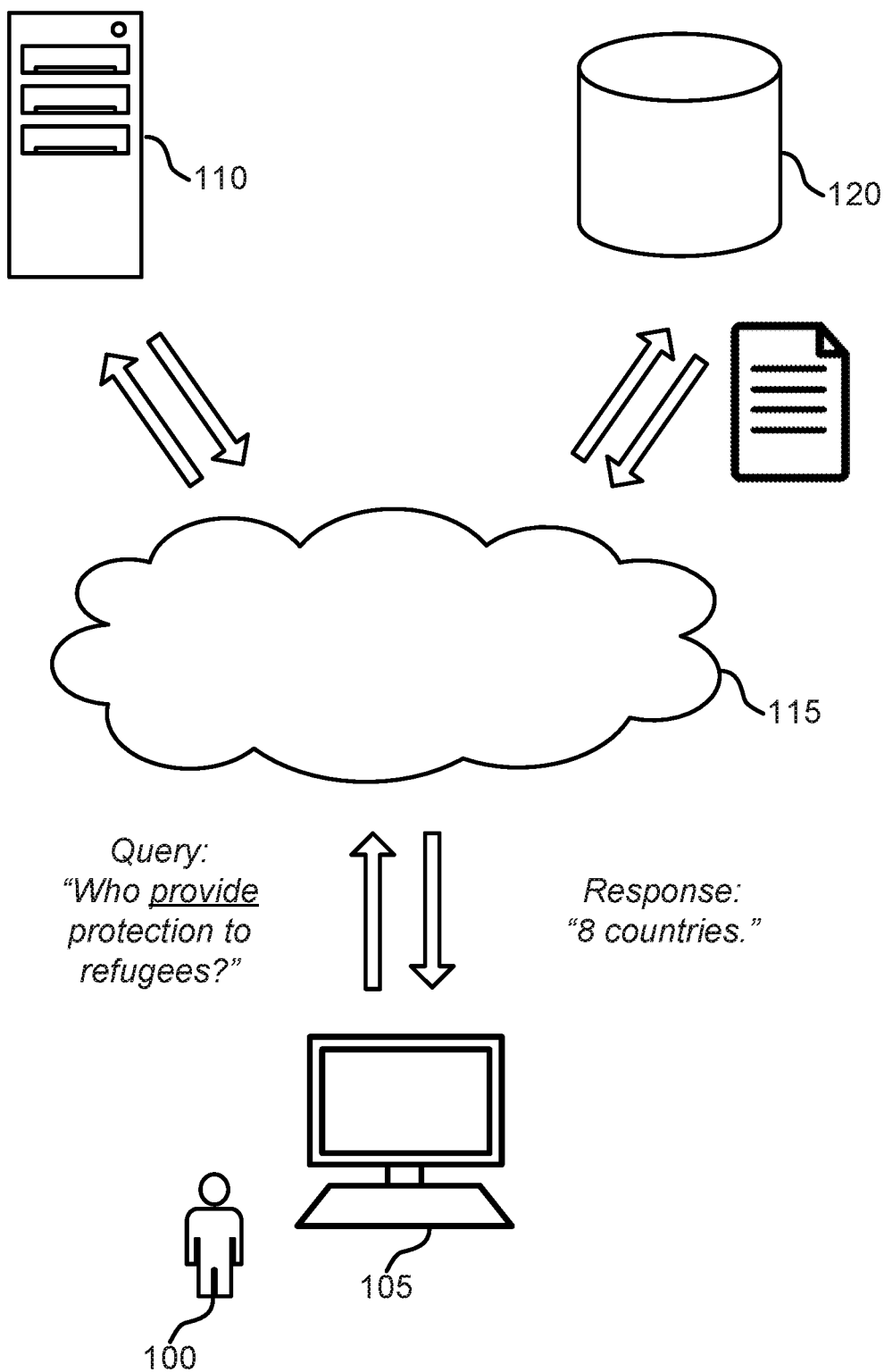
FIG. 1 shows an example of a dialogue system for natural language processing according to aspects of the present disclosure.

The present disclosure describes systems and methods for natural language processing. One or more embodiments of the disclosure provide an event argument extraction apparatus trained using machine learning to predict a relationship between an event trigger word (e.g., a word representing an event) and an argument candidate word (e.g., a word for which a relationship to the event is to be determined). The relationship can be predicted based on a high-dimensional representation vector for each word of a pruned dependency tree. For example, an event argument extraction network may be trained for document-level event argument extraction and role prediction.

In some embodiments, the event argument extraction apparatus prunes words that are not useful or relevant to identify a relationship between the event trigger word and the candidate argument word resulting in increased accuracy. In some examples, optimal transport (OT) methods are used for optimal alignment where syntactic and semantic distances of the words on a dependency path are simultaneously modeled for joint optimization. Additionally, pruning a dependency tree of a document based on semantics of the words can preserve important words and excluding irrelevant words.

Event extraction in the field of natural language processing (NLP) relates to extracting information regarding events mentioned in a document. Event extraction has wide applications in information retrieval, text summarization, etc. For example, event argument extraction recognizes the role of each entity mention towards an event trigger word. Some event argument extraction systems focus on sentence-level event argument extraction, where event trigger words and argument candidate words are present in the same sentence In these systems, document structures beyond the sentence level are not considered on a document-level in training. However, conventional event argument extraction systems are not able to perform event argument extraction where an event trigger word and a candidate argument word are in different sentences. Additionally, conventional systems cannot filter a dependency tree or determine whether words from the dependency tree are useful to identify a relationship between the event and the candidate, therefore prediction accuracy is suboptimal.

One or more embodiments of the present disclosure include a document-level event argument extraction apparatus that can identify relationship between an event trigger word and an argument candidate word far from each other in a document. A text encoder generates word representation vectors while a parser generates a dependency tree based on text and the word representation vectors. In some examples, a word representation vector comprises a vector of numerical values that locate the word in an embedding space in which words with similar meaning are close in vector distance. A dependency tree comprises a set of nodes corresponding to words of the text, and a set of relationships between the nodes representing grammatical and semantic relationships among the words.

Optimal transport is adapted to jointly consider syntactic and semantic information from document structures using a pruning component. In some examples, the pruning component regularizes contributions of unrelated context words in network prediction. GCN is used to generate a modified representation vector for each word of the pruned dependency tree. A multi-class classification network can recognize the role of an entity mention or a candidate argument word towards an event trigger word. As a result, the present invention enables detection of a relationship between an event word and another term in a complex text which includes words that aren't relevant to understanding the relationship to be extracted.

By applying the unconventional step of pruning a dependency tree using optimal transport, one or more embodiments of the present disclosure provide an event argument extraction network that can perform efficient event argument extraction at a document level. The improved network is scalable to scenarios where an event trigger word and an argument candidate word are located far from each other in a document. In some cases, supervised training may be used to train the event argument extraction network. As a result, the improved network can extract arguments of event mentions over one or more documents to provide a complete view of information for events in these documents.

Unlike conventional systems that introduce unrelated words for role prediction of a candidate argument word, the event argument extraction network herein is configured to prune the document structure by retaining words along the dependency path (DP) between the two words of interest (i.e., event trigger word and argument candidate word). In some cases, basic syntax-based rules, i.e., distance to the dependency path, are used to prune a document structure. In some examples, related words for role predictions might not just reside in the dependency path between the event trigger and the argument candidate words. Certain related words that belong to sentences other than the hosting sentences of the event trigger and argument candidate can be retained by the improved network, leading to increased accuracy in relationship prediction.

Embodiments of the present disclosure may be used in the context of information extraction, knowledge base construction, and question answering applications. For example, an event argument extraction network based on the present disclosure may be used to predict a relationship between an event trigger word and an argument candidate word. In some examples, the event trigger word and the argument candidate word belong to different sentences in a document (i.e., document-level event argument extraction). An example application of the inventive concept in the question answering context is provided with reference to FIGS. 1 and 2. Details regarding the architecture of an example event argument extraction apparatus are provided with reference to FIGS. 3 and 4. An example of a process for natural language processing are provided with reference to FIGS. 5-10. A description of an example training process is described with reference to FIGS. 11-12.

Question Answer Application

FIG. 1 shows an example of a dialogue system for natural language processing according to aspects of the present disclosure. The example shown includes user 100, user device 105, event argument extraction apparatus 110, cloud 115, and database 120. Event argument extraction apparatus 110 is an example of, or includes aspects of, the corresponding element described with reference to FIG. 3.

In the example of FIG. 1, the user 100 provide a query to the event argument extraction apparatus 110, e.g., via the user device 105 and the cloud 115. Additionally, the event argument extraction apparatus 110 receives a document including a set of words organized into a set of sentences, the words including an event trigger word and an argument candidate word. For example, the query is "who provide protection to the refugees?". In this example, "provide" may be recognized as an event trigger word. However, the event trigger word and potential candidate argument word ("countries") may come from different sentences.

The event argument extraction apparatus 110 includes a trained event argument extraction network having a text encoder, which generates a word representation vector for each word of a text. The event argument extraction apparatus 110 generates a dependency tree based on the text and the word representation vector. The event argument extraction apparatus 110 determines that at least one word of the text is independent of a relationship between the event trigger word and the argument candidate word; removes the at least one word from the dependency tree based on the determination to obtain a pruned dependency tree. Then event argument extraction apparatus 110 generates a modified representation vector for each word of the pruned dependency tree using GCN.

Accordingly, the event argument extraction apparatus 110 identifies the relationship between the event trigger word and the argument candidate word based on the modified representation vector for each word of the pruned dependency tree. In the example above, the event argument extraction network identifies an entity mention (i.e., "countries") as an argument candidate word for the event trigger word (i.e., "provide") found in the query. The event argument extraction apparatus 110 returns the predicted answer to the user 100, e.g., via the user device 105 and the cloud 115.

The user device 105 may be a personal computer, laptop computer, mainframe computer, palmtop computer, personal assistant, mobile device, or any other suitable processing apparatus. In some examples, the user device 105 includes software that incorporates an event argument extraction or a question answering application (e.g., a dialogue system). The question answering application may either include or communicate with the event argument extraction apparatus 110.

A user interface may enable a user 100 to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

The event argument extraction apparatus 110 includes a computer implemented network comprising a text encoder, a parser, a pruning component, a GCN, and a classification network. The network generates a word representation vector for each word of a text comprising an event trigger word and an argument candidate word; generates a dependency tree based on the text and the word representation vector; determines that at least one word of the text is independent of a relationship between the event trigger word and the argument candidate word; removes the at least one word from the dependency tree based on the determination to obtain a pruned dependency tree; generates a modified representation vector for each word of the pruned dependency tree using a graph convolutional network (GCN); and identifies the relationship between the event trigger word and the argument candidate word based on the modified representation vector for each word of the pruned dependency tree.

The event argument extraction apparatus 110 may also include a processor unit, a memory unit, a training component, and an I/O interface. The training component is used to train the event argument extraction (EAE) network. Additionally, the event argument extraction apparatus 110 can communicate with the database 120 via the cloud 115. In some cases, the architecture of the event argument extraction network is also referred to as a network model or an EAE network. Further detail regarding the architecture of the event argument extraction apparatus 110 is provided with reference to FIGS. 3 and 4. Further detail regarding the operation of the event argument extraction apparatus 110 is provided with reference to FIGS. 5-10.

In some cases, the event argument extraction apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
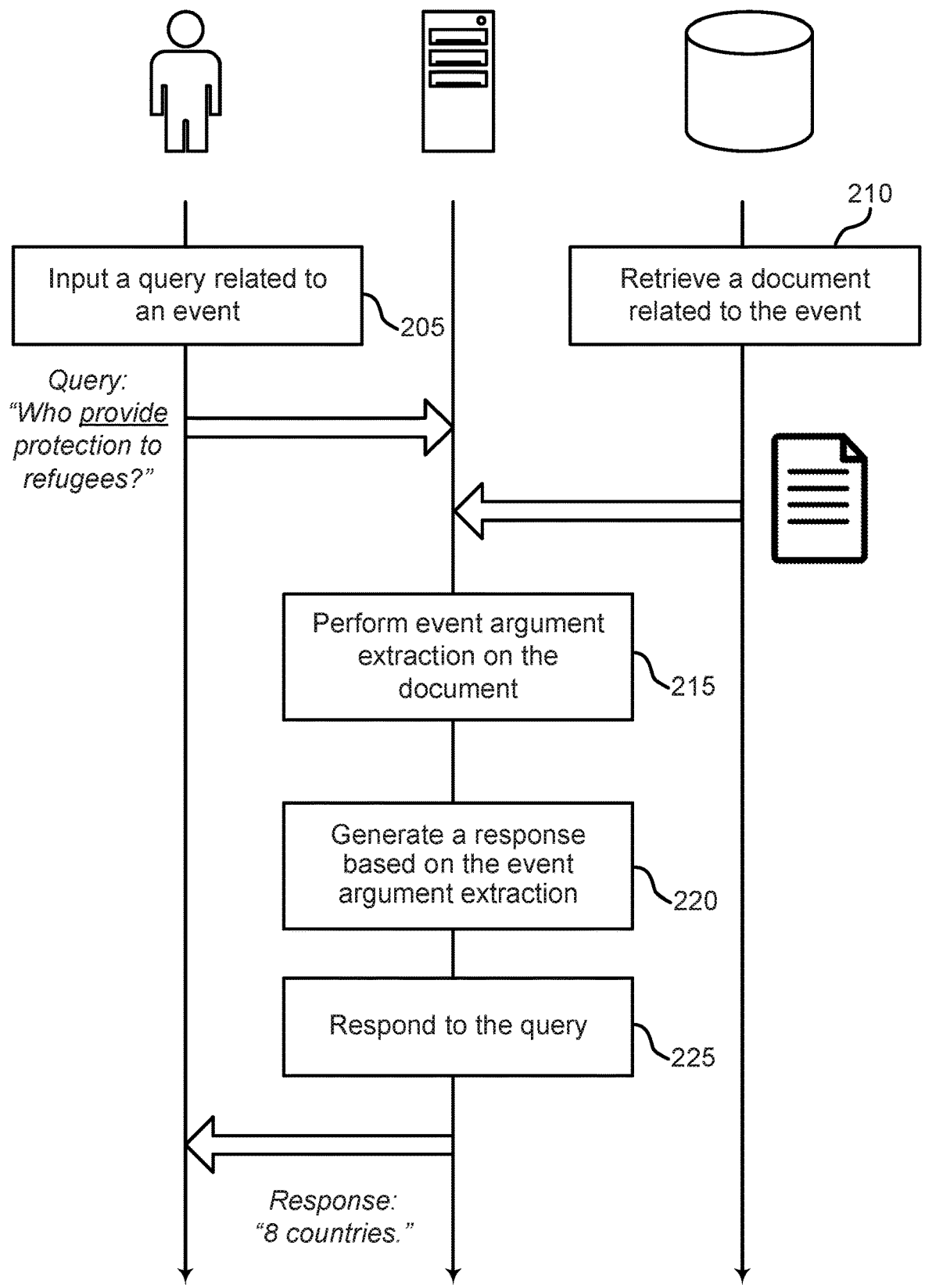
FIG. 2 shows an example of a dialogue process based on event argument extraction according to aspects of the present disclosure.

FIG. 2 shows an example of a dialogue process based on event argument extraction according to aspects of the present disclosure. The event argument extraction apparatus can be used in a dialogue application to perform event argument extraction based on user query. In some examples, a user is interested in learning the role of entity mentions (i.e., argument words) towards a specific event trigger word. The event argument extraction apparatus identifies a relationship between the event trigger word and the argument candidate word. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, a user inputs a query related to an event. In some cases, the operations of this step refer to, or may be performed by, a user as described with reference to FIG. 1. As an example, the document states "The primary goal of the plan is to provide protection to refugees. According to reports, all 8 countries that signed the plan will congregate once a quarter to monitor the progress." The user query may be "who provide protection to refugees?" The word "provide" is an event trigger word. There may be one or more argument candidate words in a document. The event trigger word may be located far from the argument candidate words.

At operation 210, the system retrieves a document related to the event. In some cases, the operations of this step refer to, or may be performed by, an event argument extraction apparatus as described with reference to FIGS. 1 and 3.

In document-level EAE, related words for role predictions might not just reside in the dependency path between the event trigger and argument candidate. Some related words that belong to sentences other than the hosting sentences of the event trigger and argument may be excluded if the document structure is pruned along the dependency path.

At operation 215, the system performs event argument extraction on the document. In some cases, the operations of this step refer to, or may be performed by, an event argument extraction apparatus as described with reference to FIGS. 1 and 3. According to the above example, the trigger word and the candidate argument word, i.e., "provide" and "countries", appear in different sentences and the dependency path (DP) between the trigger word and candidate argument is "provide→is→congregate→countries". To predict the role of the argument word, i.e., giver, one should consider the word "plan" in the first sentence and the words "plan" and "signed" in the second sentence which are not part of the DP (i.e., off the DP).

At operation 220, the system generates a response based on the event argument extraction. In some cases, the operations of this step refer to, or may be performed by, an event argument extraction apparatus as described with reference to FIGS. 1 and 3. According to the example above, the response is "8 countries", i.e., the 8 countries provide protection to refugees. The system can identify the relationship between "8 countries" and trigger word "provide" even though they are located in different sentences. In another example, "The user changes the border color of the rectangle to blue", the role of the entity "rectangle" in the "changes" event is "object".

At operation 225, the system responds to the query. In some cases, the operations of this step refer to, or may be performed by, an event argument extraction apparatus as described with reference to FIGS. 1 and 3. The system can transmit the answer to the query to the user. The user can choose to revise the query or input a different query. The system can also retrieve an additional document from the database such that the user can input a query based on the additional document.

Network Architecture

Figure 3:
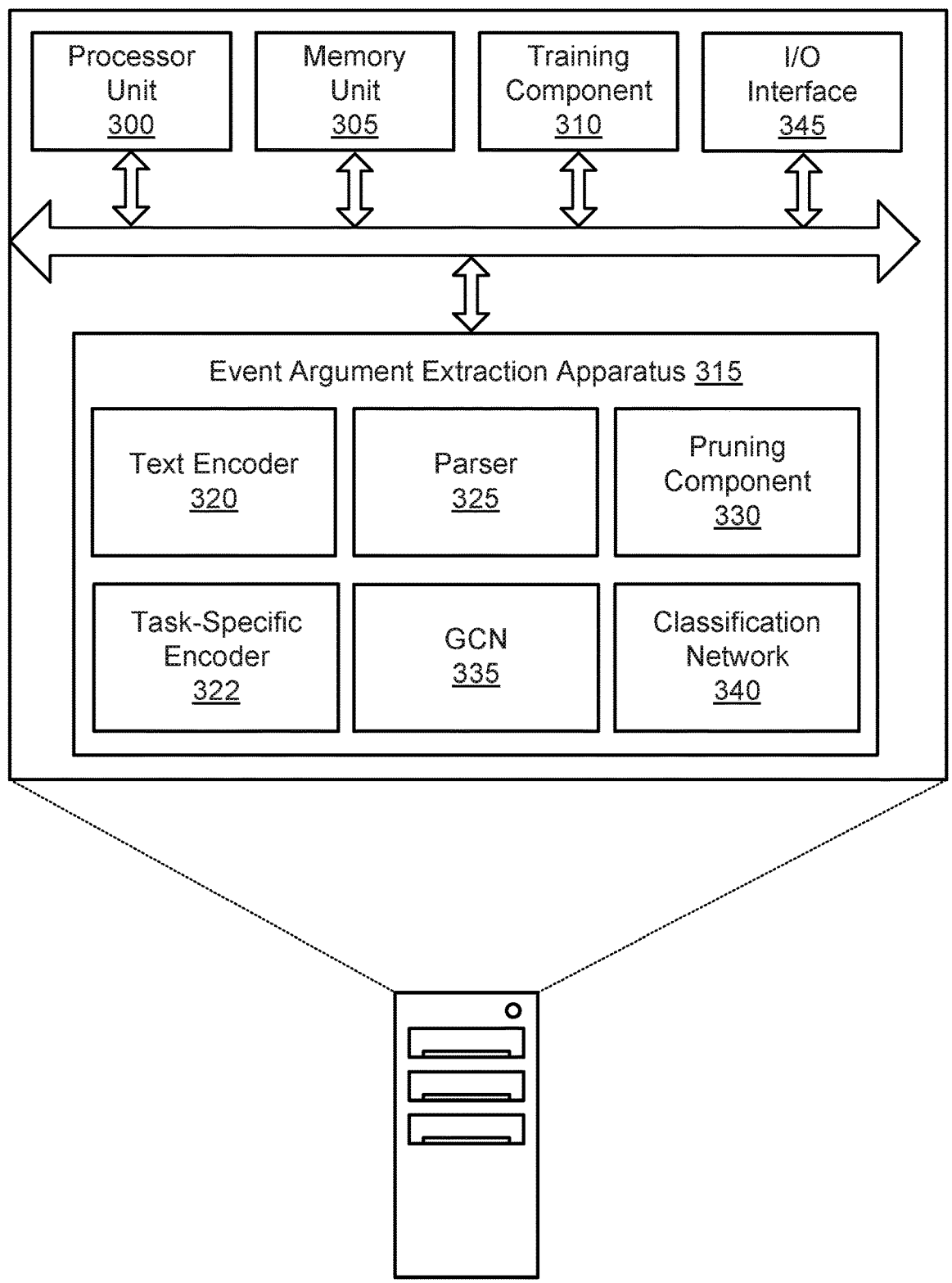
FIG. 3 shows an example of an event argument extraction apparatus according to aspects of the present disclosure.
Figure 4:
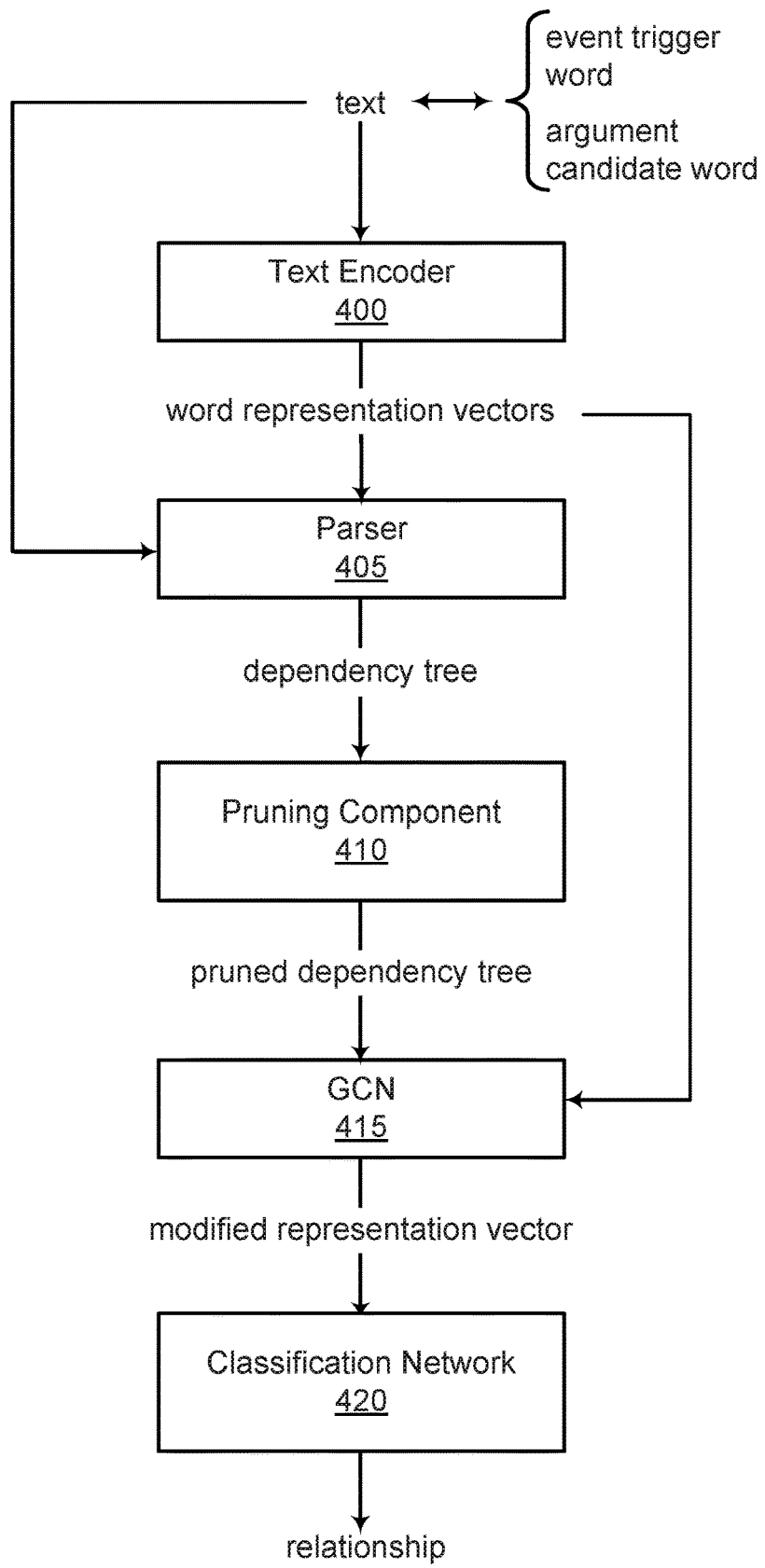
FIG. 4 shows an example of an event argument extraction diagram according to aspects of the present disclosure.

In FIGS. 3-4, an apparatus and method for natural language processing are described. One or more embodiments of the apparatus and method include a text encoder configured to generate a word representation vector for each word of a text comprising an event trigger word and an argument candidate word; a parser configured to generate a dependency tree based on the text and the word representation vector; a pruning component configured to determine that at least one word of the text is independent of a relationship between the event trigger word and the argument candidate word, and remove the at least one word from the dependency tree based on the determination to obtain a pruned dependency tree; a GCN configured to generate a modified representation vector for each word of the pruned dependency tree; and a classification network configured to identify the relationship between the event trigger word and the argument candidate word based on the modified representation vector for each word of the pruned dependency tree.

In some examples, the text encoder comprises a pre-trained encoder. A task-specific encoder may be included in the text encoder, or incorporated after the text encoder. The pre-trained encoder comprises a bi-directional encoder representations from transformers (BERT). The task-specific encoder comprises a bi-directional long short term memory (Bi-LSTM). In some examples, the text encoder comprises a word distance encoder. In some examples, the parser comprises a syntactic dependency parser. In some examples, the classification network comprises a feed-forward network.

FIG. 3 shows an example of an event argument extraction apparatus according to aspects of the present disclosure. The example shown includes processor unit 300, memory unit 305, training component 310, event argument extraction apparatus 315, and I/O interface 345. Event argument extraction apparatus 315 further includes text encoder 320, task-specific encoder 322, parser 325, pruning component 330, GCN 335, and classification network 340. Event argument extraction apparatus 315 is an example of, or includes aspects of, the corresponding element described with reference to FIG. 1.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk.

Examples of memory unit 305 include solid state memory and a hard disk drive. In some examples, a memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

I/O interface 345 (input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O interface 345 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, the event argument extraction apparatus includes a computer implemented artificial neural network (ANN) that predicts a relationship between an event trigger word and an argument candidate word based on a modified representation vector for each word of a pruned dependency tree. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 310 receives training data including text including an event trigger word, an argument candidate word, and a ground truth relationship between the event trigger word and the argument candidate word. In some examples, training component 310 computes a loss function by comparing the identified relationship to the ground truth relationship. Training component 310 then updates parameters of the classification network 340 based on the loss function. In some examples, training component 310 computes a regularization loss by comparing the modified representation vector and the unpruned modified representation vector, where the loss function includes the regularization loss. In some examples, training component 310 updates parameters of the GCN 335 jointly with the parameters of the classification network 340. In some examples, training component 310 updates parameters of a task specific encoder jointly with the parameters of the classification network 340, where the text encoder 320 includes a pre-trained encoder and the task specific encoder.

According to some aspects, text encoder 320 generates a word representation vector for each word of a text including an event trigger word and an argument candidate word. In some examples, text encoder 320 encodes each word of the text (e.g., using a pre-trained encoder) to obtain a word embedding for each word of the text. Then, text encoder 320 refines the word embedding using a task-specific encoder to obtain the word representation vector for each word of the text. In some examples, text encoder 320 generates a distance embedding representing relative distances between each word of the text and each of the event trigger word and the argument candidate word, where the word embedding is refined based on the distance embedding. In some examples, text encoder 320 computes an average of word embeddings for a set of word pieces, where the word representation vector is based on the average.

In some examples, text encoder 320 includes a pre-trained encoder and a task-specific encoder. The pre-trained encoder includes a bi-directional encoder representations from transformers (BERT). In some examples, text encoder 320 includes a word distance encoder. Text encoder 320 is an example of, or includes aspects of, the corresponding element described with reference to FIG. 4.

In some examples, task-specific encoder 322 forms a hidden representation vector for the word representation vector based on the related word representation vectors. In some examples, the task-specific encoder 322 includes a bi-directional long short-term memory (Bi-LSTM). An LSTM is a form of recurrent neural network (RNN) that includes feedback connections. In one example, and LSTM includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN. A Bi-LSTM is a form of LSTM that includes feedback connections in both the forward and backward directions.

According to some embodiments, parser 325 generates a dependency tree based on the text and the word representation vector. In some examples, parser 325 generates a document dependency tree based on a document including the text, where the modified representation vector is based on the document dependency tree. In some examples, parser 325 adds edges between consecutive sentences in the document, where the document dependency tree includes the added edges. In some examples, the parser 325 includes a syntactic dependency parser. Parser 325 is an example of, or includes aspects of, the corresponding element described with reference to FIG. 4.

According to some embodiments, pruning component 330 determines that at least one word of the text is independent of a relationship between the event trigger word and the argument candidate word. Pruning component 330 removes the at least one word from the dependency tree based on the determination to obtain a pruned dependency tree. In some examples, pruning component 330 identifies a dependency path (DP) between the event trigger word and the argument candidate word based on the dependency tree. Pruning component 330 computes an optimal transport function based on a distance between words of the text in an embedding space, where the at least one word is removed based on the optimal transport function and the dependency path. Pruning component 330 is an example of, or includes aspects of, the corresponding element described with reference to FIG. 4.

According to some embodiments, GCN 335 generates a modified representation vector for each word of the pruned dependency tree. For example, the modified representation vector can include contextual information based on relationships in the pruned dependency tree so that the meaning of each word influences the vector representation of neighboring words in the tree. In some examples, GCN 335 also computes an unpruned modified representation vector for each word of the text based on the word representation vector and the dependency tree. GCN 335 is an example of, or includes aspects of, the corresponding element described with reference to FIG. 4.

A GCN is a type of neural network that performs a convolutional operation on graphs and uses their structural information. The convolution operation can incorporate information from neighboring nodes into the representation of each node. For example, a GCN may be used for node classification (e.g., documents) in a graph (e.g., a citation network), where labels are available for a subset of nodes using a semi-supervised learning approach. A feature description for every node is summarized in a matrix and uses a form of pooling operation to produce a node level output. In some cases, GCNs use dependency trees which enrich representation vectors for aspect terms and search for sentiment polarity of an input phrase/sentence.

According to some embodiments, classification network 340 identifies the relationship between the event trigger word and the argument candidate word based on the modified representation vector for each word of the pruned dependency tree. In some examples, classification network 340 combines the modified representation vector and a first representation vector for the event trigger word and a second representation vector for the argument candidate word to obtain a combined representation vector for each word of the text. Classification network 340 is applied to the combined representation vector to obtain a set of probability values for a set of candidate relationships, where the relationship is determined based on the set of probability values. In some examples, the set of candidate relationships include a null relationship. In some examples, the classification network 340 includes a feed-forward network.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 4 shows an example of an event argument extraction diagram according to aspects of the present disclosure. The event argument extraction diagram of FIG. 4 shows the relationship between elements of the event argument extraction apparatus described with reference to FIG. 3. The example shown includes text encoder 400, parser 405, pruning component 410, GCN 415, and classification network 420.

According to some embodiments of the present disclosure, an event argument extraction apparatus (see FIG. 3) is configured to prune dependency-based structures of documents using semantics of the words which can preserve important words and exclude noisy words. Conventional systems are limited to simple syntax-based rules, i.e., distance to the dependency path, but the network model herein is aware of semantics of the words. Two criteria, i.e., syntactic and semantic relevance are considered by the network model. For example, a word is retained in the document structure for document-level EAE if the word has a small distance to the event trigger or argument words in the dependency structure (i.e., syntax-based importance) and is semantically related to one of the words in the dependency path (i.e., semantics-based importance). The semantic similarity between words can be obtained from the representations of the words induced by the model. In some cases, the different nature of the syntactic and semantic distances may complicate the information combination to determine the importance of a word for the structure. The retention decision for a word may be contextualized in the potential contributions of other words in the document structure for EAE.

As an example diagram illustrated in FIG. 4, from top to bottom, text is input to text encoder 400. Text encoder 400 generates a word representation vector for each word of the text. Text encoder 400 is an example of, or includes aspects of, the corresponding element described with reference to FIG. 3. In some examples, text is a document uploaded by a user or retrieved from a source website (stored in a database). The text includes an event trigger word and an argument candidate word.

Next, word representation vectors are input to parser 405. Parser 405 is configured to parse the document to identify relationships among words of the text. Parser 405 forms a dependency tree representing the text based on the relationships. Parser 405 is an example of, or includes aspects of, the corresponding element described with reference to FIG. 3. The dependency tree is input to pruning component 410.

According to an embodiment, pruning component 410 is configured to determine that at least one word of the text is independent of a relationship between the event trigger word and the argument candidate word. Pruning component 410 removes the at least one word from the dependency tree based on the determination to obtain a pruned dependency tree. Pruning component 410 is an example of, or includes aspects of, the corresponding element described with reference to FIG. 3.

According to an embodiment, GCN 415 is used to generate a modified representation vector for each word of the pruned dependency tree. GCN 415 is an example of, or includes aspects of, the corresponding element described with reference to FIG. 3.

According to an embodiment, classification network 420 is configured to identify the relationship between the event trigger word and the argument candidate word based on the modified representation vector for each word of the pruned dependency tree. Classification network 420 is an example of, or includes aspects of, the corresponding element described with reference to FIG. 3

Event Argument Extraction

In accordance with FIGS. 5-10, a method, apparatus, and non-transitory computer readable medium for natural language processing are described. One or more embodiments of the method, apparatus, and non-transitory computer readable medium include generating a word representation vector for each word of a text comprising an event trigger word and an argument candidate word; generating a dependency tree based on the text and the word representation vector; determining that at least one word of the text is independent of a relationship between the event trigger word and the argument candidate word; removing the at least one word from the dependency tree based on the determination to obtain a pruned dependency tree; generating a modified representation vector for each word of the pruned dependency tree using a graph convolutional network (GCN); and identifying the relationship between the event trigger word and the argument candidate word based on the modified representation vector for each word of the pruned dependency tree.

Some examples of the method, apparatus, and non-transitory computer readable medium further include encoding each word of the text using a pre-trained encoder to obtain a word embedding for each word of the text. Some examples further include refining the word embedding using a task-specific encoder to obtain the word representation vector for each word of the text.

Some examples of the method, apparatus, and non-transitory computer readable medium further include generating a distance embedding representing relative distances between each word of the text and each of the event trigger word and the argument candidate word, wherein the word embedding is refined based on the distance embedding.

Some examples of the method, apparatus, and non-transitory computer readable medium further include computing an average of word embeddings for a plurality of word pieces, wherein the word representation vector is based on the average.

Some examples of the method, apparatus, and non-transitory computer readable medium further include identifying a dependency path (DP) between the event trigger word and the argument candidate word based on the dependency tree. Some examples further include computing an optimal transport function based on a distance between words of the text in an embedding space, wherein the at least one word is removed based on the optimal transport function and the dependency path.

Some examples of the method, apparatus, and non-transitory computer readable medium further include generating a document dependency tree based on a document including the text, wherein the modified representation vector is based on the document dependency tree. Some examples of the method, apparatus, and non-transitory computer readable medium further include adding edges between consecutive sentences in the document, wherein the document dependency tree includes the added edges.

Some examples of the method, apparatus, and non-transitory computer readable medium further include combining the modified representation vector, a first representation vector for the event trigger word and a second representation vector for the argument candidate word to obtain a combined representation vector for each word of the text. Some examples further include applying a classification network to the combined representation vector to obtain a set of probability values for a plurality of candidate relationships, wherein the relationship is determined based on the set of probability values. In some examples, the plurality of candidate relationships includes a null relationship.

Figure 5:
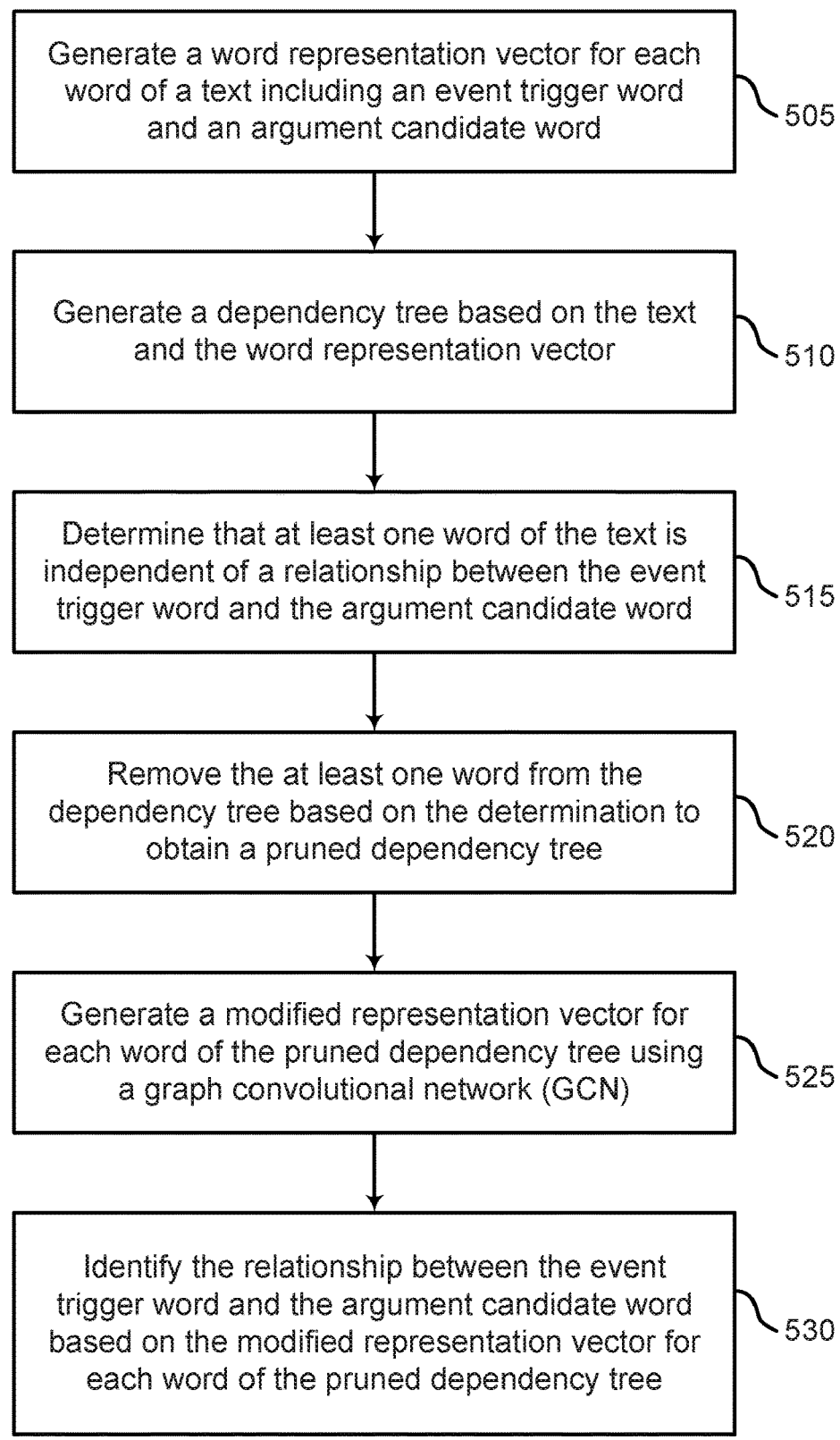
FIG. 5 shows an example of an event argument extraction process according to aspects of the present disclosure.

FIG. 5 shows an example of an event argument extraction process according to aspects of the present disclosure. In some examples, these operations are performed by a system including a processor executing a set of codes to control functional elements of an apparatus, such as the event argument extraction apparatus 110 of FIG. 1. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system generates a word representation vector for each word of a text including an event trigger word and an argument candidate word. In some cases, the operations of this step refer to, or may be performed by, a text encoder as described with reference to FIGS. 3 and 4. According to an embodiment, a text encoder of the EAE system is configured to generate a word representation vector for each word of a text comprising an event trigger word and an argument candidate word.

The EAE task recognizes the role of entity mentions towards a specific event trigger. The EAE task is formulated as a multi-class classification problem. Given a document $D=[w_1, w_2, \ldots, w_n]$, with the trigger word $w_t$ and the candidate argument $w_a$, the model is trained to predict one of the labels $L=[l_1, l_2, \ldots, l_m]$ as the role of the candidate argument $w_a$ in the event evoked by the trigger $w_t$. The label set L contains a custom label None to indicate that the candidate argument $w_a$ is not a participant in the event $w_t$.

At operation 510, the system generates a dependency tree based on the text and the word representation vector. In some cases, the operations of this step refer to, or may be performed by, a parser as described with reference to FIGS. 3 and 4. A dependency tree for a sentence is a directed acyclic graph with words as nodes and relations as edges. Each word in the sentence either modifies another word or is modified by a word. In some cases, the root of the tree is the only entry that is modified but does not modify anything else. The mechanism is based on the concept that there is a direct link between every linguistic unit of a sentence. These links are termed dependencies. The relationship between any two words is marked by a dependency tag. In some examples, dependency trees are created based on sentences of a document such that the system can apply the syntactic structure of the document.

At operation 515, the system determines that at least one word of the text is independent of a relationship between the event trigger word and the argument candidate word. In some cases, the operations of this step refer to, or may be performed by, a pruning component as described with reference to FIGS. 3 and 4. In some cases, the system can prune the document structure to exclusively retain words along the dependency path (DP) between the two words of interest (i.e., event trigger and argument candidate). Basic syntax-based rules, i.e., distance to the dependency path, are used to prune a document structure. In some other cases, related words for role predictions might not solely reside in the dependency path between the event trigger and argument candidate for event argument extraction. Some related words that belong to sentences other than the hosting sentences of the event trigger and candidate argument may be excluded if the document structure is pruned along the dependency path. The system can incorporate these related words (but off the dependency path) in subsequent vector representation to achieve a more accurate role prediction. The system determines that at least one word of the text is independent of a relationship between the event trigger word and the argument candidate word.

At operation 520, the system removes the at least one word from the dependency tree based on the determination to obtain a pruned dependency tree. In some cases, the operations of this step refer to, or may be performed by, a pruning component as described with reference to FIGS. 3 and 4.

In some cases, the syntactic structure (i.e., dependency tree) of each sentence is used and the roots of the structure are connected to each other to create a connected graph for an input document (i.e., document structure) in document-level relation extraction. In some cases, a document structure is pruned by exclusively retaining words along the dependency path (DP) between the two words of interest (i.e., event trigger and argument candidate). In some cases, simple syntax-based rules, i.e., distance to the dependency path, are used to prune a document structure.

According to an embodiment of the present disclosure, a document structure-aware network model for document-level EAE relies on dependency trees of sentences. In some cases, optimal transport is used to prune dependency trees for documents in EAE tasks. The network model also depends on regularization to explicitly constrain the contribution of irrelevant words for representation learning.

At operation 525, the system generates a modified representation vector for each word of the pruned dependency tree using a graph convolutional network (GCN). In some cases, the operations of this step refer to, or may be performed by, a GCN as described with reference to FIGS. 3 and 4. The GCN learns abstract representation vectors for the words (e.g., most abstract representation vectors) of the pruned dependency tree. For example, the Bi-LSTM-induced vectors in H can be used as inputs to the GCN, which then incorporates information from neighboring nodes in a dependency tree (or a pruned dependency tree) into each word representation vector.

At operation 530, the system identifies the relationship between the event trigger word and the argument candidate word based on the modified representation vector for each word of the pruned dependency tree. In some cases, the operations of this step refer to, or may be performed by, a classification network as described with reference to FIG. 3. In some examples, the relationship is the role of a candidate argument in the event evoked by the trigger word. An example text is "The primary goal of the plan is to provide protection to refugees. According to reports, all 8 countries that signed the plan will congregate once a quarter to monitor the progress." The trigger and the candidate argument are "provide" and "countries". The predicted role of the argument towards the event trigger is giver. Other relationships may include "object", "attribute", etc. In another example, "The user changes the border color of the rectangle to blue", the role of the entity "rectangle" in the "changes" event is "object".

According to some embodiments, a network model includes multiple components such as an input encoder, a dependency pruning component, a regularization component, and prediction network. Input encoder is configured to represent the words in the document using high-dimensional vectors. Next, the dependency pruning component is configured to prune unrelated words in the dependency tree via optimal transport (OT). Dependency pruning is followed by regularization which minimizes the contribution of unrelated words for representation learning. Finally, the network model depends on the representations induced for the words of the document to generate final prediction.

Figure 6:
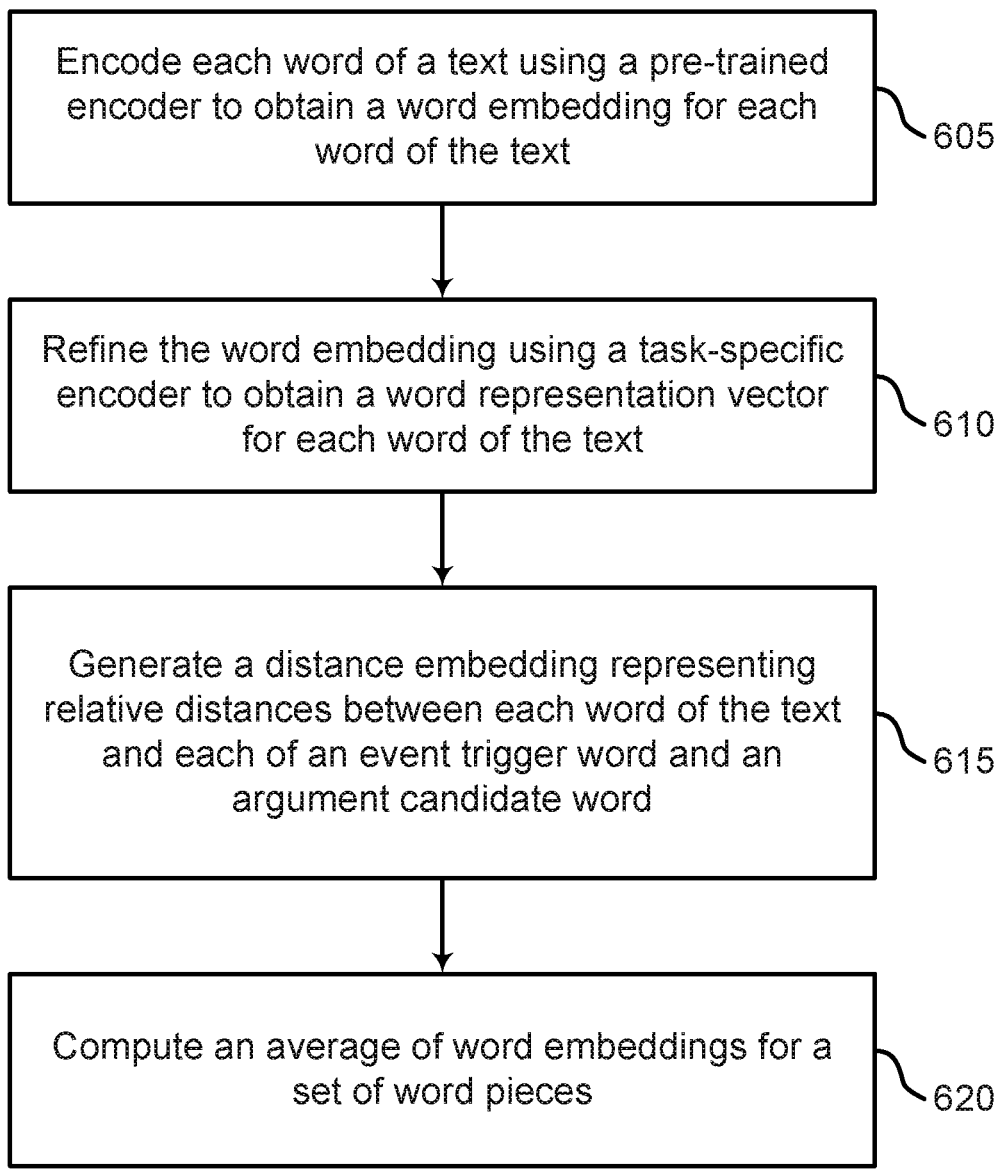
FIG. 6 shows an example of encoding text according to aspects of the present disclosure.

FIG. 6 shows an example of encoding text according to aspects of the present disclosure. FIG. 6 illustrates a process of generating a word representation vector for each word of a text described with reference to FIG. 5. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system encodes each word of a text using a pre-trained encoder to obtain a word embedding for each word of the text. In some cases, the operations of this step refer to, or may be performed by, a text encoder as described with reference to FIGS. 3 and 4.

At operation 610, the system refines the word embedding using a task-specific encoder to obtain a word representation vector for each word of the text. In some cases, the operations of this step refer to, or may be performed by, a task-specific encoder as described with reference to FIG. 3.

Input encoder represents each word $w_i \in D$ using a high dimensional vector $x_i$. The vector $x_i$ is constructed by concatenating the contextualized word embedding and distance embedding vectors. In case of contextualized word embedding, the input text $[CLS] w_1 w_2 \ldots w_n [SEP]$ is input into a word encoder such as a BERT model, and the hidden state of $w_i$ is used in the final layer as the contextualized word embedding. "CLS" is the reserved token to represent the start of sequence while "SEP" separate segment (or sentence). In some examples, some words may have multiple word-pieces, so the network model takes the average of word-piece representations.

At operation 615, the system generates a distance embedding representing relative distances between each word of the text and each of an event trigger word and an argument candidate word. In some cases, the operations of this step refer to, or may be performed by, a text encoder as described with reference to FIGS. 3 and 4.

Distance embeddings are calculated such that the relative distances of the word $w_i$ towards the trigger and the argument words (i.e., |i−t| and |i−a|) are represented using high dimensional vectors obtained from a distance embedding table (the table is initialized randomly). The distance embedding table is updated during training. In some cases, the BERT parameters are fixed. The vectors $X=[x_1, x_2, \ldots, x_n]$ are input to a sequence processing model (i.e., bi-directional long short-term memory network, also known as Bi-LSTM) to tailor the vectors $x_i$ for EAE tasks. The hidden states obtained from the Bi-LSTM, i.e., $H=[h_1, h_2, \ldots, h_a]$, are consumed by the dependency pruning, regularization, and prediction components.

At operation 620, the system computes an average of word embeddings for a set of word pieces. In some cases, the operations of this step refer to, or may be performed by, a text encoder as described with reference to FIGS. 3 and 4.

Figure 7:
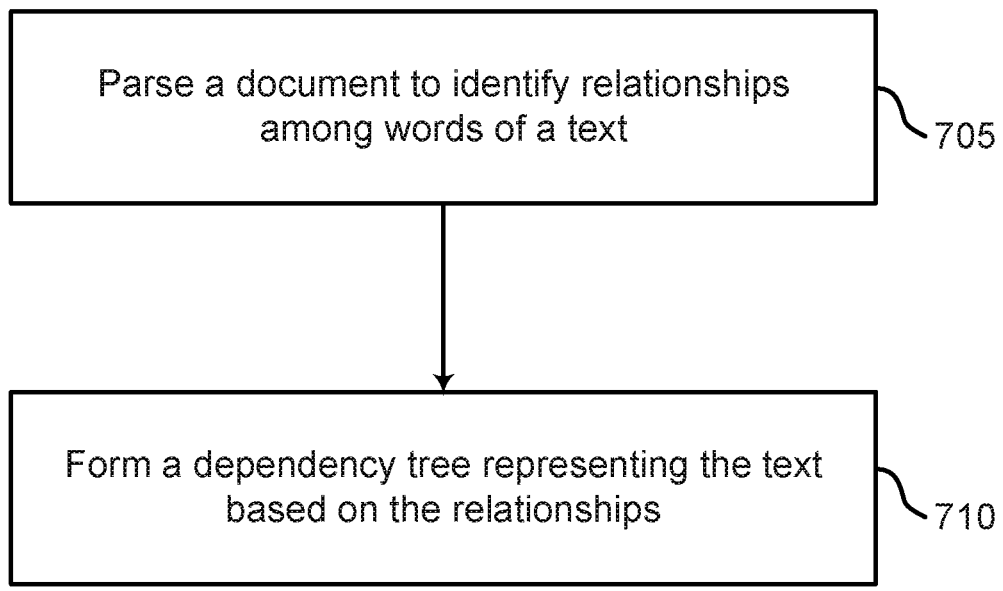
FIG. 7 shows an example of generating a dependency tree according to aspects of the present disclosure.

FIG. 7 shows an example of generating a dependency tree according to aspects of the present disclosure. FIG. 7 illustrates a process of generating a dependency tree based on the text and the word representation vector described with reference to FIG. 5. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system parses a document to identify relationships among words of a text. In some cases, the operations of this step refer to, or may be performed by, a parser as described with reference to FIGS. 3 and 4. According to an embodiment, a parser of the event argument extraction apparatus is configured to parse the document to identify relationships among words of the text by generating a dependency tree based on the text and the word representation vector.

At operation 710, the system forms a dependency tree representing the text based on the relationships. In some cases, the operations of this step refer to, or may be performed by, a parser as described with reference to FIGS. 3 and 4.

According to an embodiment, the network model uses dependency trees of the sentences in the document to employ the syntactic structure of the input document D. The undirected versions of the dependency trees generated by a probabilistic natural language parser (e.g., Stanford CoreNLP parser) are used. An edge between roots of the dependency trees for every pair of consecutive sentences in D is added to connect the dependency trees of the sentences to form a single dependency graph for D. The generated syntactic tree for D is denoted as T and T contains all the words, i.e., $w_i \in D$.

Figure 8:
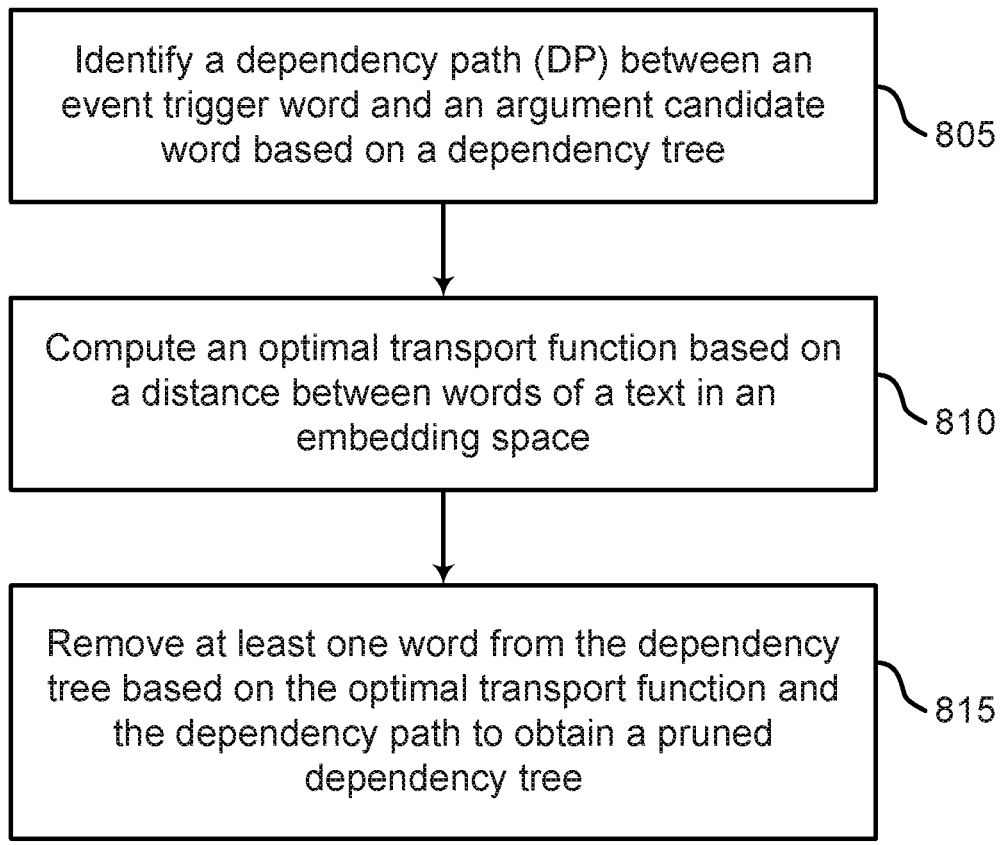
FIG. 8 shows an example of pruning a dependency tree according to aspects of the present disclosure.

FIG. 8 shows an example of pruning a dependency tree according to aspects of the present disclosure. FIG. 8 illustrates a process of removing one or more words from a dependency tree to obtain a pruned dependency tree described with reference to FIG. 5. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system identifies a dependency path (DP) between an event trigger word and an argument candidate word based on a dependency tree. In some cases, the operations of this step refer to, or may be performed by, a pruning component as described with reference to FIGS. 3 and 4.

The full tree T for D may include both related and unrelated words for the argument role prediction of $w_a$ with respect to the event trigger $w_t$. Therefore, the full tree for D is pruned to exclusively retain the related words. In some cases, the potential noises introduced by unrelated words for representation learning can be prevented. According to an embodiment of the present disclosure, a dependency path (DP) is formed between the event trigger $w_t$ and the argument candidate $w_a$ in T as the anchor to prune the unrelated words. In some cases, off-of-DP words in T that are syntactically and semantically close to the words in the dependency path (i.e., aligning off-of-DP and on-the-DP words) are re-trained (e.g., to prevent missing important context words for prediction).

At operation 810, the system computes an optimal transport function based on a distance between words of a text in an embedding space. In some cases, the operations of this step refer to, or may be performed by, a pruning component as described with reference to FIGS. 3 and 4.

The optimal transport (OT) method jointly considers syntax and semantics for the word alignment. OT can be used to find the optimal plan to convert (i.e., transport) one distribution to another distribution. Given the probability distributions p(x) and q(y) over the domains X and $\mathcal{Y}$, and the cost or distance function $C(x, y): X \times \mathcal{Y} \rightarrow \mathbb{R}_+$ for mapping X to $\mathcal{Y}$, OT method can find the optimal joint alignment or distribution $\pi^*(x, y)$ (over $X \times \mathcal{Y}$) with marginals p(x) and q(y), i.e., the cheapest transportation from p(x) to q(y), by solving the equation:

$$\pi^*(x,y) = \min_{\pi \in \Pi(x,y)} \int_y \int_x \pi(x,y) C(x,y) \, dx \, dy \text{ s.t. } x \sim p(x) \text{ and } y \sim \quad (1)$$

where $\Pi(x, y)$ is the set of joint distributions with marginals p(x) and q(y). When the distributions p(x) and q(y) are discrete, the integrals in the above equation are replaced with a sum and the joint distribution $\pi^*(x, y)$ is represented by a matrix whose entry (x, y) ($x \in X$, $y \in \mathcal{Y}$) represents the probability of transforming the data point x to y to convert the distribution p(x) to q(y). In some examples, each row of $\pi^*(x, y)$ is aligned with the column with the highest probability, i.e., $y^* = \text{argmax}_{x_y \in \mathcal{Y}} \pi^*(x, y)$ where $y^*$ is the data point in y aligned with the data point $x \in X$ to obtain a hard alignment between data points X and y.

OT method finds a transportation (i.e., an alignment) between two groups of data points with lowest cost according to the following criteria, i.e., the distance between data points and the difference between probability masses of data points. The above criteria include the semantic and syntactic similarity used in the network model to find an alignment between off-the-DP and on-the-DP words. The words on the DP are used as data points in the domain y and the words off-the-DP are used as data points in the domain X. The syntax-based importance scores are used to compute the distributions p(x) and q(y) (i.e., probability masses for data points) for x∈X and y∈ $\mathcal{Y}$. In some examples, for a word $w_i$, the distance of the word to the trigger word/phrase and the candidate argument in the dependency tree (i.e., lengths of dependency paths), denoted as $d_i^t$ and $d_i^a$, respectively, are computed. The probability mass for a word x=$w_i$∈X is computed as the minimum of the two distances, i.e., p(x) =min($d_i^t$, $d_i^a$). Similarly, the distribution p(y) is computed. p(x) and p(y) are normalized using softmax over the corresponding sets to obtain distributions. According to an embodiment of the present disclosure, the network model uses the semantic information based on Euclidean distance of the representation vectors $h_x$ and $h_y$ in H:C(x, y)=$\|h_x-h_y\|$ to obtain the distance or transportation cost C(x, y) between every pair of words (x, y)∈X× $\mathcal{Y}$.

At operation 815, the system removes at least one word from the dependency tree based on the optimal transport function and the dependency path to obtain a pruned dependency tree. In some cases, the operations of this step refer to, or may be performed by, a pruning component as described with reference to FIGS. 3 and 4.

According to an embodiment, dependency path is incorporated as the anchor for document structure pruning, and accordingly the event argument extraction apparatus of the present disclosure jointly considers syntactic and semantic distances of words to locate an optimal alignment between off-the-DP and on-the-DP words. The optimal alignment is achieved using optimal transport (OT) methods where syntactic and semantic distances of words to the distances on the dependency path are simultaneously modeled in a joint optimization task. OT method efficiently finds an optimal transport plan (i.e., an alignment) between two groups of points (i.e., off-the-DP and on-the-DP words). The alignment is based on the pairwise transportation costs and the distribution mass accumulated on the points.

According to an embodiment of the present disclosure, the network model uses semantic similarity of words to obtain the transportation costs of words while syntactic distances to the event trigger or argument candidate words are used to compute mass distributions of words for OT in document-level EAE. Additionally, to prune the document structure, an off-the DP word is considered important for the document structure (thus retained) if it is aligned to one of the on-the-DP words via OT method. The pruned document structure is used to learn representation vectors for input documents to perform argument role predictions using GCN. In some cases, OT-based pruning method excludes unrelated words for EAE in the document structure.

The OT method is used to calculate the optimal alignment π*(x, y) that can be used to align each data point in X with one data point in $\mathcal{Y}^2$. The network model finds a subset of data points in X to be aligned with data points in $\mathcal{Y}$ for retention in the dependency structure for D. An extra data point NULL is added to $\mathcal{Y}$ whose representation is computed by averaging the representations of all data points in X and probability mass is the average of probability masses of the data points in X. Alignments with the NULL data point in $\mathcal{Y}$ serves as null alignment indicating that the aligned data point in X, i.e., an off-the-DP word, is not to be kept in the pruned tree. Other words in X with a non-null alignment, called I(I⊂X), are to be preserved in the pruned tree for D. The removal of NULL-assigned off-of-DP words from T produces an additional graph that includes words (e.g., most important words) for argument role prediction for D. According to an embodiment, the network model retains words along the dependency paths between the trigger or argument words and a word in I, leading to the additional graph T' to represent D with important context words which ensures connectivity of the additional graph T'. In some cases, T' may also be referred to as a pruned tree.

Figure 9:
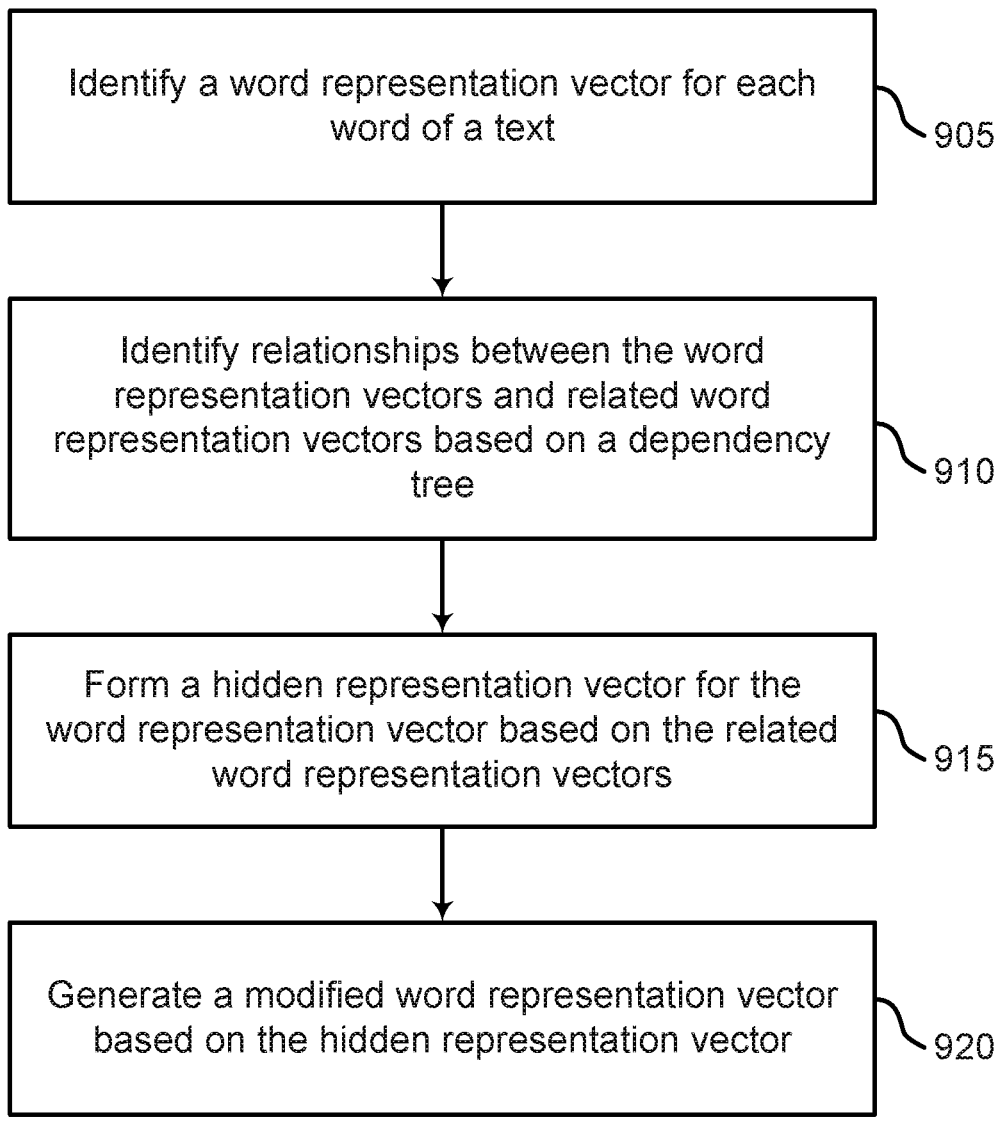
FIG. 9 shows an example of a graph convolution process according to aspects of the present disclosure.

FIG. 9 shows an example of a graph convolution process according to aspects of the present disclosure. FIG. 9 illustrates a process of generating a modified representation vector for each word of the pruned dependency tree using a graph convolutional network (GCN) described with reference to FIG. 5. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some examples, OT-based pruning method helps exclude unrelated words for EAE in the document structure. Certain noisy information might be encoded in the representations of the related words due to contextualization in the input encoder (e.g., BERT). One or more embodiments of the present disclosure constrain the impact of unrelated words for representation learning using regularization based on the pruned document structure. Regularization prevents noisy information from being encoded in the representations of related words due to contextualization in the input encoder. The network model can add unrelated words back to the pruned structure resulting in restoration of the original tree. Additionally, representation vectors are minimally modified due to this addition of unrelated words. The network model applies a GCN over the original dependency structure to obtain another set of representation vectors for the words. The difference between the representation vectors obtained from the pruned and original structures is calculated as part of a final loss function to achieve the contribution constraint for unrelated words. In the experiments, the network model is evaluated on both sentence-level and document-level EAE benchmark datasets. Detail regarding training and evaluation will be described below in FIGS. 11-12.

At operation 905, the system identifies a word representation vector for each word of a text. In some cases, the operations of this step refer to, or may be performed by, a text encoder as described with reference to FIGS. 3 and 4.

At operation 910, the system identifies relationships between the word representation vectors and related word representation vectors based on a dependency tree. In some examples, words that are not relevant to the event trigger word are pruned from the dependency tree. In some cases, the operations of this step refer to, or may be performed by, a parser as described with reference to FIGS. 3 and 4.

At operation 915, the system forms a hidden representation vector for the word representation vector based on the related word representation vectors. In some cases, the operations of this step refer to, or may be performed by, a task-specific encoder as described with reference to FIG. 3.

At operation 920, the system generates a modified word representation vector based on the hidden representation vector. For example, the modified word representation may be generated by a GCN as described below. In some cases, the operations of this step refer to, or may be performed by, a GCN as described with reference to FIGS. 3 and 4.

A GCN is a type of neural network that performs a convolutional operation on graphs and uses their structural information. The convolution operation can incorporate information from neighboring nodes into the representation of each node. For example, a GCN may be used for node classification (e.g., documents) in a graph (e.g., a citation network), where labels are available for a subset of nodes using a semi-supervised learning approach. A feature description for every node is summarized in a matrix and uses a form of pooling operation to produce a node level output. In some cases, GCNs use dependency trees which enrich representation vectors for aspect terms and search for sentiment polarity of an input phrase/sentence.

According to an embodiment, a GCN uses the graph T' to learn abstract representation vectors for the words (e.g., most abstract representation vectors) in T', using Bi-LSTM-induced vectors in H as the inputs. The hidden vectors produced in the last layer of the GCN model GCN are denoted by: $H'=h'_{i_1}, \ldots, h'_{i_m}=GCN(H, T')$ where m is the number of words in T'(m<n) and $h'_{i_k}$ is the vector for the word $w_{i_k}$ (i.e., the k-word in T').

The representation vectors in H' are computed using the pruned tree T' to encode related or important context words and exclude noisy information from unrelated words for the role prediction of $w_a$. In some examples, noisy information of unrelated words may be included in the representations H for the selected words in the pruned tree T' due to the contextualization from the input encoder (BERT). Thus, the noisy information is propagated by the GCN into the representations H'. One or more embodiments of the present disclosure include regularization method to constrain the contribution of unrelated words for representation learning. The regularization uses representations obtained from every word in D to be similar to the representations obtained exclusively from the related words in T'. In some cases, adding unrelated words might not change the representations significantly.

In some examples, regularization is implemented based on the representation vectors from GCN because the output vectors from the GCN (i.e., the modified word representation vectors) are used by the role prediction (i.e., classification). According to an embodiment, the hidden states H and the full dependency tree T for D are input to the same GCN model, i.e., H"=GCN(H, T). Next, the vector representation vectors $\bar{h}'$ and $\bar{h}"$ for the sets H' (based on T) and H"(based on T) are computed by performing a sample-based discretization process (e.g., max pooling), i.e., $\bar{h}'=MAX\_POOL(h'_{i_1}, \ldots, h'_{i_m})$ and $\bar{h}"=MAX\_POOL(h"_1, h"_2, \ldots, h"_n)$.

Figure 10:
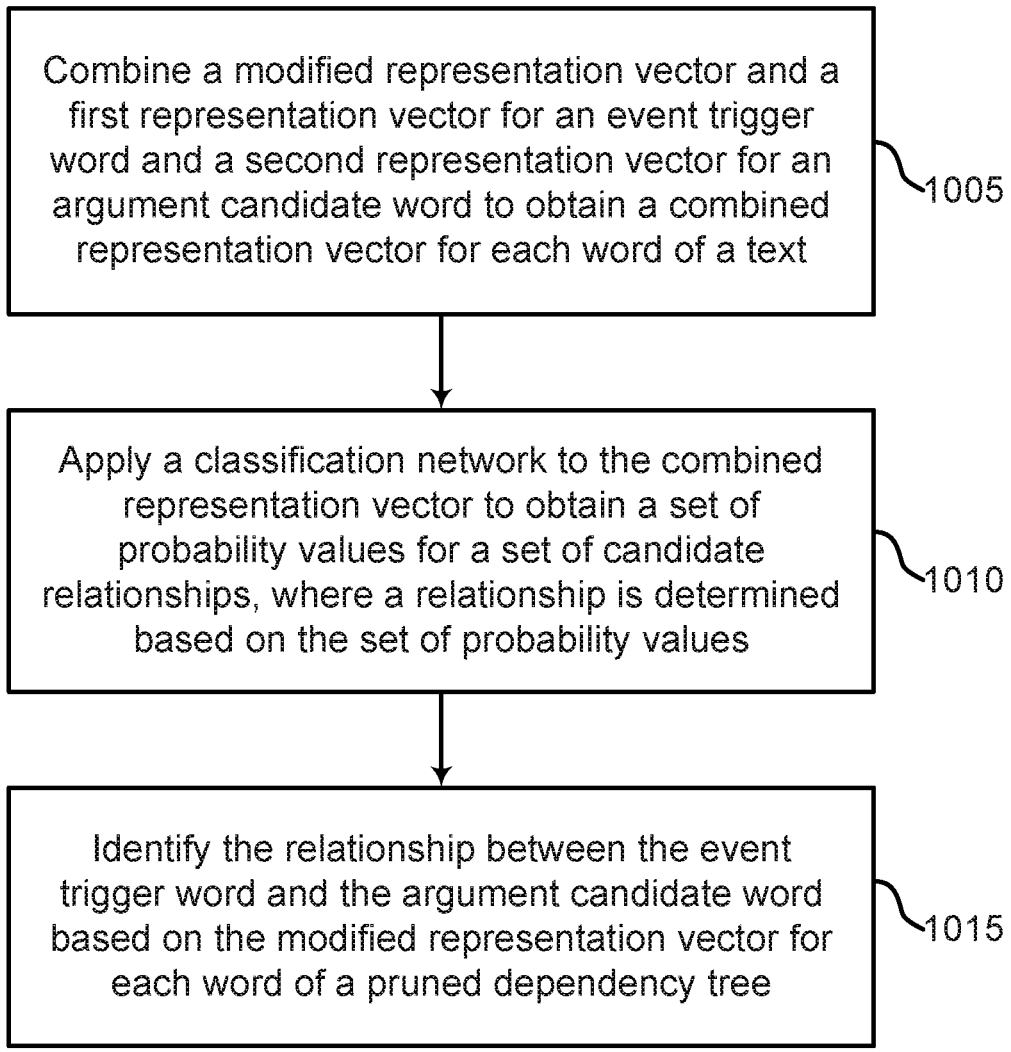
FIG. 10 shows an example of a classification process using a prediction network according to aspects of the present disclosure.

FIG. 10 shows an example of a classification process using a prediction network according to aspects of the present disclosure. FIG. 10 illustrates a process of identifying a relationship between an event trigger word and an argument candidate word described with reference to FIG. 5. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system combines a modified representation vector and a first representation vector for an event trigger word and a second representation vector for an argument candidate word to obtain a combined representation vector for each word of a text. In some cases, the operations of this step refer to, or may be performed by, a classification network as described with reference to FIG. 3.

At operation 1010, the system applies a classification network to the combined representation vector to obtain a set of probability values for a set of candidate relationships, where a relationship is determined based on the set of probability values. In some cases, the operations of this step refer to, or may be performed by, a classification network as described with reference to FIG. 3.

According to an embodiment of the present disclosure, an overall vector is used to perform the argument role prediction for a candidate argument ($w_a$) and trigger ($w_t$). The overall vector is denoted as $V=[h'_t, h'_a, \bar{h}']$, where $h'_t$ and $h'_a$ are the representation vectors for $w_a$ and $w_t$ in H'. The overall vector V is consumed by a two-layer feed-forward network to obtain the distribution $P(\cdot|D, w_t, w_a)$ over possible argument roles.

At operation 1015, the system identifies the relationship between the event trigger word and the argument candidate word based on the modified representation vector for each word of a pruned dependency tree. In some cases, the operations of this step refer to, or may be performed by, a classification network as described with reference to FIG. 3.

Training and Evaluation

Figure 11:
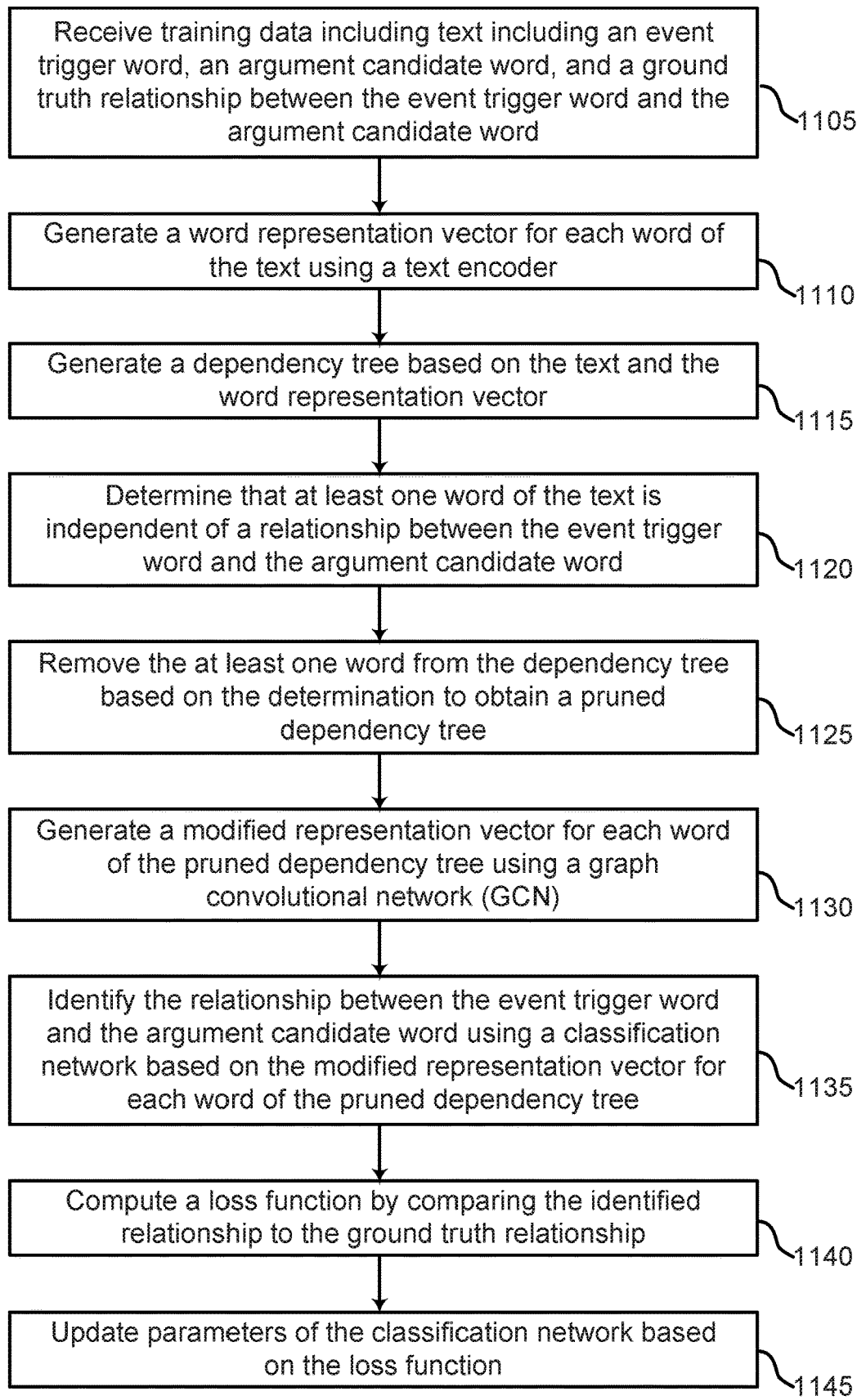
FIG. 11 shows an example of training a neural network for event argument extraction according to aspects of the present disclosure.
Figure 12:
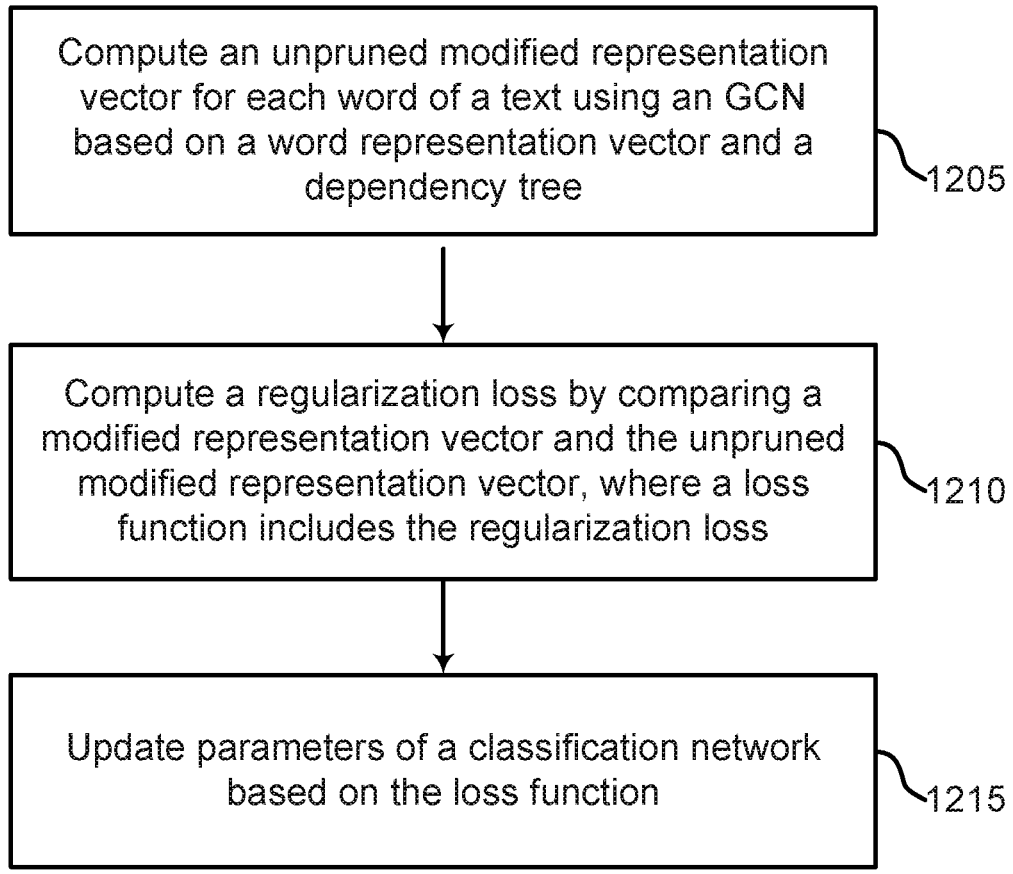
FIG. 12 shows an example of training a neural network based on regularization according to aspects of the present disclosure.

In accordance with FIGS. 11-12, a method, apparatus, and non-transitory computer readable medium for training a neural network are described. One or more embodiments of the method, apparatus, and non-transitory computer readable medium include receiving training data including text comprising an event trigger word, an argument candidate word, and a ground truth relationship between the event trigger word and the argument candidate word; generating a word representation vector for each word of the text using a text encoder; generating a dependency tree based on the text and the word representation vector; determining that at least one word of the text is independent of a relationship between the event trigger word and the argument candidate word; removing the at least one word from the dependency tree based on the determination to obtain a pruned dependency tree; generating a modified representation vector for each word of the pruned dependency tree using a graph convolutional network (GCN); identifying the relationship between the event trigger word and the argument candidate word using a classification network based on the modified representation vector for each word of the pruned dependency tree; computing a loss function by comparing the identified relationship to the ground truth relationship; and updating parameters of the classification network based on the loss function.

Some examples of the method, apparatus, and non-transitory computer readable medium further include computing an unpruned modified representation vector for each word of the text using the GCN based on the word representation vector and the dependency tree. Some examples further include computing a regularization loss by comparing the modified representation vector and the unpruned modified representation vector, wherein the loss function includes the regularization loss.

Some examples of the method, apparatus, and non-transitory computer readable medium further include updating parameters of the GCN jointly with the parameters of the classification network. Some examples of the method, apparatus, and non-transitory computer readable medium further include updating parameters of a task specific encoder jointly with the parameters of the classification network, wherein the text encoder includes a pre-trained encoder and the task specific encoder. In one embodiment, the pre-trained encoder comprises a bi-directional encoder representations from transformers (BERT), and the task-specific encoder comprises a bi-directional long short term memory (Bi-LSTM).

FIG. 11 shows an example of training a neural network for event argument extraction according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Accordingly, during the training process, the parameters and weights of an event argument extraction network are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

One or more embodiments of the present disclosure use supervised training techniques. Supervised learning is one of the three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function correctly determine the class labels for unseen instances. In other words, the learning algorithm generalizes from the training data to unseen examples.

At operation 1105, the system receives training data including text including an event trigger word, an argument candidate word, and a ground truth relationship between the event trigger word and the argument candidate word. In some cases, the operations of this step refer to, or may be performed by, a training component as described with reference to FIG. 3.

One or more embodiments of the present disclosure evaluate an optimal transport-based event argument extraction (OTEAE) model on a multi-sentence argument linking dataset (e.g., roles across multiple sentences, or RAMS) for document-level EAE. For example, the dataset includes 9,124 annotated event mentions across 139 event types for 65 argument roles. Additionally, the dataset contains a training, development and test sets, and evaluation scripts.

A random search is used to tune the hyperparameters for the network model. The hyperparameters are selected based on precision and accuracy (e.g., F1 scores) on development set of the dataset (e.g., RAMS). The hyper-parameters from the fine-tuning are applied on a multi-lingual training corpus (e.g., ACE 2005 dataset) for consistency. Therefore, the hyperparameters include 50 dimensions for position embeddings, 1 layer for Bi-LSTM and 2 layers for GCN, 150 dimensions for the hidden states of the Bi-LSTM, GCN and feed-forward networks, 64 for the batch size, 0.2 for the learning rate with the Adam optimizer, and 0.1 for the trade-off parameter $\beta$.

At operation 1110, the system generates a word representation vector for each word of the text using a text encoder. In some cases, the operations of this step refer to, or may be performed by, a text encoder as described with reference to FIGS. 3 and 4.

At operation 1115, the system generates a dependency tree based on the text and the word representation vector. In some cases, the operations of this step refer to, or may be performed by, a parser as described with reference to FIGS. 3 and 4. According to an embodiment, a parser of the event argument extraction apparatus is configured to parse the document to identify relationships among words of the text by generating a dependency tree based on the text and the word representation vector.

At operation 1120, the system determines that at least one word of the text is independent of a relationship between the event trigger word and the argument candidate word. In some cases, the operations of this step refer to, or may be performed by, a pruning component as described with reference to FIGS. 3 and 4.

At operation 1125, the system removes the at least one word from the dependency tree based on the determination to obtain a pruned dependency tree. In some cases, the operations of this step refer to, or may be performed by, a pruning component as described with reference to FIGS. 3 and 4.

At operation 1130, the system generates a modified representation vector for each word of the pruned dependency tree using a graph convolutional network (GCN). In some cases, the operations of this step refer to, or may be performed by, a GCN as described with reference to FIGS. 3 and 4.

According to an embodiment of the present disclosure, an overall vector is used to perform the argument role prediction for a candidate argument ($w_a$) and trigger ($w_t$). The overall vector is denoted as $V=[h'_t, h'_a, \overline{h}']$, where $h'_t$ and $h'_a$ are the representation vectors for $w_a$ and $w_t$ in H'. The overall vector V is consumed by a two-layer feed-forward network to obtain the distribution $P(\cdot|D, w_t, w_a)$ over possible argument roles.

At operation 1135, the system identifies the relationship between the event trigger word and the argument candidate word using a classification network based on the modified representation vector for each word of the pruned dependency tree. In some cases, the operations of this step refer to, or may be performed by, a classification network as described with reference to FIG. 3.

At operation 1140, the system computes a loss function by comparing the identified relationship to the ground truth relationship. In some cases, the operations of this step refer to, or may be performed by, a training component as described with reference to FIG. 3.

In some examples, a supervised training model may be used that includes a loss function that compares predictions of the event argument extraction network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

According to an embodiment, a negative log likelihood loss: $\mathcal{L}_{pred}=-\log P(l|D, w_t, w_a)$ is used to train the network model, where l is the ground truth label. The overall loss function for the network model is: $\mathcal{L}=\mathcal{L}_{pred}+\beta\mathcal{L}_{reg}$, where β is a trade-off parameter.

At operation 1145, the system updates parameters of the classification network based on the loss function. In some cases, the operations of this step refer to, or may be performed by, a training component as described with reference to FIG. 3.

FIG. 12 shows an example of training a neural network based on regularization according to aspects of the present disclosure. FIG. 12 illustrates a process of computing a loss function including a regularization loss where parameters of a classification network are updated based on the loss function described with reference to FIG. 11. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system computes an unpruned modified representation vector for each word of a text using a GCN based on a word representation vector and a dependency tree. In some cases, the operations of this step refer to, or may be performed by, a GCN as described with reference to FIGS. 3 and 4.

At operation 1210, the system computes a regularization loss by comparing a modified representation vector and the unpruned modified representation vector, where a loss function includes the regularization loss. In some cases, the operations of this step refer to, or may be performed by, a training component as described with reference to FIG. 3.

The regularization is implemented based on the representation vectors from GCN because the output vectors from the GCN are used for subsequent role prediction. According to an embodiment, the hidden states H and the full dependency tree T for D are input to the same GCN model, i.e., H''=GCN(H, T). Next, the vector representation vectors $\bar{h}'$ and $\bar{h}''$ for the sets H' (based on T) and H'' (based on T) are computed by performing a sample-based discretization process (e.g., max pooling), i.e., $\bar{h}'=MAX\_POOL(h'_{i_1}, \ldots, h'_{i_m})$ and $\bar{h}''=MAX\_POOL(h''_1, h''_2, \ldots, h''_n)$. The similarity of $\bar{h}'$ and $\bar{h}''$ is applied by adding their $L_2$ distance into the overall loss function as follows: $\mathcal{L}_{reg}=\bar{h}'-\bar{h}''$.

At operation 1215, the system updates parameters of a classification network based on the loss function. In some cases, the operations of this step refer to, or may be performed by, a training component as described with reference to FIG. 3.

Performance of apparatus, systems and methods of the present disclosure have been evaluated, and results indicate embodiments of the present disclosure obtain increased performance over existing technology. Example experiments demonstrate that the event argument extraction network outperforms conventional systems. In some cases, terms such as event argument extraction network, network model, or optimal transport-based event argument extraction (OTEAE) model are used interchangeably.

One or more embodiments of the present disclosure compare the network model with two groups of baselines for a multi-sentence argument linking dataset. In some cases, a model is compared with sequence-based deep models that ignore the syntactic structure of the input document, for example, RAMS model, Head-based, and Joint models. Additionally, structure-aware deep learning models used for a related task (i.e., document-level relation extraction) are examined and adapted for EAE for further comparison and evaluation. In some examples, the network model is compared with iDepNN, GCNN, LSR, and EoG models. The iDepNN model applies the syntactic structure of the document with pruning along the dependency path. The GCNN model uses syntactic and discourse-level (i.e., coreference links) structures to encode a document. Additionally, the LSR model infers document structures by a deep reasoning module, and the EoG model encodes syntactic and discourse structures using high dimensional vectors to represent the edges of the structure graphs.

Performance of the models in different settings are evaluated and recorded, e.g., standard decoding and type constrained settings for a multi-sentence argument linking dataset (RAMS). The label is predicted by operating argmax on the probability distribution $P(\bullet|D, w_t, w_a)$ in a standard decoding setting. The type constrained setting includes prediction of the models for a given candidate argument and event trigger is constrained to the set of permissible roles for the event type of the given event trigger. For example, the probabilities of non-permissible roles for the event type evoked by $w_t$ are set to zero before applying argmax on $P(\bullet|D, w_t, w_a)$.

The network model outperforms both sequence-based and structure-aware baselines in standard decoding and type constrained settings on a multi-sentence argument linking dataset (e.g., RAMS dataset with p<0.01). The network model can capture long-distance dependencies between words in multiple sentences (using syntactic structures) that can encode documents with richer information. Moreover, compared to the document structure-aware baselines, increased performance of the network model is due to optimal transport that can recognize optimal trade-off between semantics-based and syntax-based importance of the words which filter unrelated words to learn document structures for EAE. In some cases, baseline models use manual rules that are not adjustable when computing document structures to prune unrelated words. For example, iDepNN model prunes syntactic structures along dependency paths, the EoG and GCNN models use heuristic discourse information (e.g., coreference links) which decreases model performance.

Additionally, the performance of the network model is evaluated on a multi-lingual training corpus (e.g., ACE 2005 dataset) for the sentence-level EAE task. The corpus includes 599 documents, 33 event subtypes and 35 argument roles. Data split (i.e., training, development and test split) and pre-processing scripts are applied, and a ground-truth event trigger and argument spans are pre-determined for the dataset. The performance of OTEAE, Joint, and BERT-based models have been evaluated. The BERT-based model uses the Bi-LSTM vectors in H to form the overall representation vector $V=[h_t, h_a, MAX\_POOL(h_1, \ldots, h_a)]$ for predictions (i.e., OT-based pruning and regularization are not applied here).

Event argument extraction apparatus of the present disclosure shows competitive performance for sentence-level EAE. Increased performance of OTEAE over BERT-based models shows that dependency pruning and regularization are beneficial for representation learning in sentence-level EAE.

The OTEAE model includes structure generator and regularization components. The structure generator component infers pruned dependency structures for documents and the regularization component explicitly excludes the unrelated information. An ablation study is conducted that uses $Reg^-$, $OT^-$, Prune, and $GCN^-$ models to analyze the effectiveness of the structure generator and regularization components for the network model. The performance of the following ablated models are evaluated. The $Reg^-$ model excludes the regularization loss, i.e., $\mathcal{L}_{reg}$, from the overall loss function $\mathcal{L}$. The $OT^-$ baseline eliminates the OT-based component for tree pruning, instead, $OT^-$ baseline prunes dependency structures along dependency paths. The Prune model employs full dependency tree as the structure to be consumed by the GCN model. The regularization component, which depends on a pruned tree, is excluded from the final loss function. The $GCN^-$ model excludes the GCN model from OTEAE of the present disclosure. The vectors for final predictions and regularization are computed over the Bi-LSTM-induced vectors in H while retaining OT-based pruning and regularization components. The final prediction vector V is constructed as $V=[h_t, h_a, \tilde{h}]$ where $\tilde{h}=MAX\_POOL(h_{i_1}, \ldots, h_{i_m})$, i.e., max pooling is done over the words in the pruned tree T' from OT. The regularization term in the overall loss function is replaced by: $\mathcal{L}_{reg}=\|\tilde{h}-\bar{h}\|$ where $\bar{h}=MAX\_POOL(h_1, \ldots, h_n)$, i.e., max-pooling is performed over all the words in D. The ablation study demonstrates use of structure generator and regularization components in the OTEAE model to achieve its highest performance. As a result, optimal transport can be used to select important context words to produce document structures for document-level EAE. Increased performance of OTEAE over $OT^-$ and $Prune^-$ shows that using exclusively dependency paths or full dependency structures is suboptimal to produce document structures for document-level EAE, while OT can better select important context words for documents.

Furthermore, another ablation study is performed to evaluate the importance of OT for tree pruning. In some cases, use of syntax-based and semantic-based criteria are evaluated by $Syntax^-$ and $Semantics^-$ ablated models to prune the dependency tree. Additionally, dependency paths are considered during pruning by evaluating the $DP^-$ model. Following ablated models are studied and results are recorded. The $Syntax^-$ model uses a uniform distribution for p(x) and q(y) in OT, thus excluding the syntactic distances of the words to the trigger or argument from OT computation. A constant cost function, i.e., C(x, y)=1, is used in the $Semantics^-$ baseline for OT so the representation-based similarities between the words are not used by OT. The $DP^-$ model includes a domain (Y) having the trigger and the argument words, and the domain X involves the remaining words in D, i.e., including the ones on the dependency paths. The extra node "NULL" is added into $\mathcal{Y}$ in the $DP^-$ model to represent null alignments. As a result, OT analysis on a development split of a RAMS dataset shows that removing either syntax-based (i.e., $Syntax^-$) or semantic-based (i.e., $Semantics^-$) criterion negatively affects the model performance. Therefore, both criteria should be used to prune the dependency tree. Additionally, removing semantic-based criterion results in higher performance reduction in the OTEAE model compared to the syntax-based criterion. Note the semantic-based criterion is not used in existing methods for document structure inference with tree pruning. Using only the trigger or argument words as the anchor points for positive alignment (i.e., $DP^-$) is not optimal, showing that dependency paths are important for optimal transport to find related words in documents for EAE.

Furthermore, performance of the network model is evaluated in intra-sentence and inter-sentence settings. In case of intra-sentence setting, both trigger and argument words appear in the same sentence, i.e., the number of sentences between the trigger and the argument is zero. Alternatively, in case of inter-sentence setting, the trigger and argument appear in different sentences, i.e., the number of sentences in between is non-zero. The OTEAE model is compared with existing models for document-level EAE, for example, RAMS model and Joint models while assuming type-constrained decoding. The OTEAE model outperforms existing models for document-level EAE with respect to both inter-sentence and intra-sentence settings.

OTEAE model is also compared to existing document-level EAE models. In some cases, text segments are analyzed where the OTEAE model can predict the argument role, while conventional document structure-aware baselines (e.g., iDepNN, EoG, GCNN, and LSR) fail to predict the argument role. For example, a text segment may be, "The massive explosions destroyed vehicles on a highway just outside the base at the Syrian port-city of Tartus, northwestern Syria. It is understood the first blast was a car bomb planted outside the base. The second explosion was a suicide bomber who detonated his belt as people rushed to help those injured, AFP reported." The text includes the trigger word (i.e., "detonated") and the argument word (i.e., "Tartus") are in two different sentences with an additional sentence in between the words. As a result, the document structure is relied upon to infer the role of the argument due to the distance between the trigger word and the argument word. Additionally, a successful prediction should encode the mentions, i.e., massive explosions in the first sentence and second explosion in the second sentence, and the associated semantic similarity. Note none of these phrases are on the dependency path between the trigger word and the argument word in the document's dependency graph, leading to failure of the baseline models. The OT-based selection method of the present disclosure can select both the phrases (i.e., massive explosions and second explosion) for inclusion in the pruned tree T' for representation learning.

Similarly, an example document has the text "There are worrying reports of the tundra burning in the Arctic Yamal Peninsula, as well as other damaging fires, for example a 3,000-hectare blaze at the Lena Pillars Nature Park. Ecologists say the fires pose a direct threat to the role of Siberian pristine Boreal in absorbing climate-warming emissions."

The word, "fire" in the second sentence, is used to correctly predict the argument role for Siberian pristine Boreal. Note the word "fire" does not belong to the dependency path between the trigger word and argument word which makes prediction difficult for existing models. But the event argument extraction apparatus makes a correct prediction as the optimal transport includes the word "fire" for the document structure.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for natural language processing, comprising:
generating a word representation vector for each word of a text comprising an event trigger word and an argument candidate word;
generating a dependency tree based on the text and the word representation vector for each word of the text;
identifying a dependency path (DP) between the event trigger word and the argument candidate word based on the dependency tree;
computing an optimal transport function based on a distance between words of the text in an embedding space;
determining that at least one word of the text is independent of a relationship between the event trigger word and the argument candidate word based on the optimal transport function and the dependency path;
removing the at least one word from the dependency tree based on the determination to obtain a pruned dependency tree;
generating a modified representation vector for each word of the pruned dependency tree using a graph convolutional network (GCN); and
identifying the relationship between the event trigger word and the argument candidate word based on the modified representation vector for each word of the pruned dependency tree.

2. The method of claim 1, further comprising:
encoding each word of the text using a pre-trained encoder to obtain a word embedding for each word of the text; and
refining the word embedding using a task-specific encoder to obtain the word representation vector for each word of the text.

3. The method of claim 2, further comprising:
generating a distance embedding representing relative distances between each word of the text and each of the event trigger word and the argument candidate word, wherein the word embedding is refined based on the distance embedding.

4. The method of claim 2, further comprising:
computing an average of word embeddings for a plurality of word pieces, wherein the word representation vector is based on the average.

5. The method of claim 1, further comprising:
generating a document dependency tree based on a document including the text, wherein the modified representation vector is based on the document dependency tree.

6. The method of claim 5, further comprising:
adding edges between consecutive sentences in the document, wherein the document dependency tree includes the added edges.

7. The method of claim 1, further comprising:
combining the modified representation vector and a first representation vector for the event trigger word and a second representation vector for the argument candidate word to obtain a combined representation vector for each word of the text; and
applying a classification network to the combined representation vector to obtain a set of probability values for a plurality of candidate relationships, wherein the relationship is determined based on the set of probability values.

8. The method of claim 7, wherein:
the plurality of candidate relationships includes a null relationship.

9. A method for training a neural network, comprising:
receiving training data including text comprising an event trigger word, an argument candidate word, and a ground truth relationship between the event trigger word and the argument candidate word;
generating a word representation vector for each word of the text using a text encoder;
generating a dependency tree based on the text and the word representation vector for each word of the text;
generating a document dependency tree based on a document including the text;
adding edges between consecutive sentences in the document, wherein the document dependency tree includes the added edges;
determining that at least one word of the text is independent of a relationship between the event trigger word and the argument candidate word;
removing the at least one word from the dependency tree based on the determination to obtain a pruned dependency tree;
generating a modified representation vector for each word of the pruned dependency tree using a graph convolutional network (GCN) based on the document dependency tree;
identifying the relationship between the event trigger word and the argument candidate word using a classification network based on the modified representation vector for each word of the pruned dependency tree;
computing a loss function by comparing the identified relationship to the ground truth relationship; and updating parameters of the classification network based on the loss function.

10. The method of claim 9, further comprising:
computing an unpruned modified representation vector for each word of the text using the GCN based on the word representation vector and the dependency tree; and
computing a regularization loss by comparing the modified representation vector and the unpruned modified representation vector, wherein the loss function includes the regularization loss.

11. The method of claim 9, further comprising:
updating parameters of the GCN jointly with the parameters of the classification network.

12. The method of claim 9, further comprising:
updating parameters of a task specific encoder jointly with the parameters of the classification network, wherein the text encoder includes a pre-trained encoder and the task specific encoder.

13. An apparatus for natural language processing, comprising:
a text encoder configured to generate a word representation vector for each word of a text comprising an event trigger word and an argument candidate word;
a parser configured to generate a dependency tree based on the text and the word representation vector for each word of the text;
a pruning component configured to determine that at least one word of the text is independent of a relationship between the event trigger word and the argument candidate word, and remove the at least one word from the dependency tree based on the determination to obtain a pruned dependency tree;
a graph convolutional network (GCN) configured to generate a modified representation vector for each word of the pruned dependency tree; and
a classification network configured to combine the modified representation vector and a first representation vector for the event trigger word and a second representation vector for the argument candidate word to obtain a combined representation vector for each word of the text, obtain a set of probability values for a plurality of candidate relationships, identify the relationship between the event trigger word and the argument candidate word based on the modified representation vector for each word of the pruned dependency tree and the set of probability values.

14. The apparatus of claim 13, wherein:
the text encoder comprises a pre-trained encoder and a task-specific encoder.

15. The apparatus of claim 14, wherein:
the pre-trained encoder comprises a bi-directional encoder representations from transformers (BERT).

16. The apparatus of claim 14, wherein:
the task-specific encoder comprises a bi-directional long short-term memory (Bi-LSTM).

17. The apparatus of claim 13, wherein:
the text encoder comprises a word distance encoder.

18. The apparatus of claim 13, wherein:
the parser comprises a syntactic dependency parser.

19. The apparatus of claim 13, wherein:
the classification network comprises a feed-forward network.

* * * * *